US009189733B2

(12) United States Patent
Thompson et al.

(10) Patent No.: US 9,189,733 B2
(45) Date of Patent: Nov. 17, 2015

(54) SYSTEMS AND METHODS FOR VECTOR SCALABILITY OF EVOLUTIONARY ALGORITHMS

(71) Applicant: THE AEROSPACE CORPORATION, El Segundo, CA (US)

(72) Inventors: Timothy Guy Thompson, Purcellville, VA (US); Matthew Phillip Ferringer, Round Hill, VA (US)

(73) Assignee: The Aerospace Corporation, El Segundo, CA (US)

(*) Notice: Subject to any disclaimer, the term of this patent is extended or adjusted under 35 U.S.C. 154(b) by 457 days.

(21) Appl. No.: 13/799,819

(22) Filed: Mar. 13, 2013

(65) Prior Publication Data
US 2014/0279766 A1 Sep. 18, 2014

(51) Int. Cl.
G06N 3/12 (2006.01)

(52) U.S. Cl.
CPC . G06N 3/126 (2013.01); G06N 3/12 (2013.01)

(58) Field of Classification Search
None
See application file for complete search history.

(56) References Cited

U.S. PATENT DOCUMENTS

| 5,568,500 | A | 10/1996 | Tolson |
| 6,532,076 | B1 | 3/2003 | Sidorowich |
| 7,996,344 | B1 | 8/2011 | Goel |
| 8,069,127 | B2 | 11/2011 | Taylor et al. |
| 8,255,344 | B2 | 8/2012 | Ferringer et al. |
| 8,255,345 | B2 | 8/2012 | Ferringer et al. |
| 8,285,653 | B2 | 10/2012 | Ferringer et al. |
| 8,433,662 | B2 | 4/2013 | Ferringer et al. |
| 2008/0010044 | A1 | 1/2008 | Ruetsch |
| 2010/0292929 | A1 | 11/2010 | Ferringer et al. |
| 2010/0293120 | A1 | 11/2010 | Ferringer et al. |
| 2010/0293122 | A1 | 11/2010 | Ferringer et al. |
| 2011/0078100 | A1 | 3/2011 | Goel |
| 2012/0084314 | A1 | 4/2012 | Ferringer et al. |

OTHER PUBLICATIONS

Muhlenbein, Heinz et al.; "Evolution in time and space—the parallel genetic algorithm."; 1991; Morgan Kaufmann; pp. 1-22.
Cantu-Paz, Erick et al.; "Efficient parallel genetic algorithms: theory and practice." 2000; Comput. Methods Appl. Mech. Engrg. 186 (2000) pp. 221-238; Elsevier Science S.A.
Search Report and Written Opinion for International Application No. PCT/US2010/034955 mailed Aug. 17, 2010.
Ferringer, Matthew P. et al.; "Many-objective Reconfiguration of Operational Satellite Constellations with the Large-Cluster Epsilon Non-dominated Sorting Genetic Algorithm-II." 2009 IEEE Congress on Evolutionary Computation, 10 pages.
Ferringer, Matthew P. et al., "Pareto-hypervolumes for the Reconfiguration of Satellite Constellations." AIAA/AAS Astrodynamics Specialist Conference and Exhibit. Aug. 18-21, 2008, p. 1-31.

(Continued)

Primary Examiner — Stanley K Hill
(74) Attorney, Agent, or Firm — Sutherland, Asbill and Brennan LLP

(57) ABSTRACT

Systems and methods are provided to enable vector scalability in evolutionary algorithms to enable execution of optimization problems having a relatively large number of variables. A subset of the total number of variables of a chromosome data structure may be considered relative to a baseline known solution for the purpose of evaluating one or more objective functions of the evolutionary algorithm.

20 Claims, 11 Drawing Sheets

(56) References Cited

OTHER PUBLICATIONS

Yong Tang, "Advancing Hydrologic Model Evaluation and Identification Using Multiobjective Calibration Sensitivity Analysis and Parallel Computation." ProQuest Information and Learning Company. 2007, 48 pages.
Scott Zimmer et al., "Utilizing Evolutionary Algorithms for Problems with Vast Infeasible Regions and Expensive Function Evaluations." The Aerospace Corporation. Jun. 27, 2008, 12 pages.
Theodore R. Stodgell et al., "Satellite Rendezvous Tours Using Multiobjective Evolutionary Optimization." The Pennsylvania State University. 28 pages.
Joshua B. Kollat et al., "A Framework for Visually Interactive Decision-making and Design using Evolutionary Multi-objective Optimization (VIDEO)" Environmental Modelling & Software 22. 2007, 1691-1704.
Joshua B. Kollat et al., "A New Epsilon-Dominance Hierarchical Bayesian Optimization Algorithm for Large Multiobjective Monitoring Network Design Problems" Advances in Water Resources 31. 2008, 828-845.
Y. Tang et al., "Parallelization Strategies for Rapid and Robust Evolutionary Multiobjective Optimization in Water Resources Applications." Advances in Water Resources. 2006, 1-39.
Patrick M. Reed et al. "Parallel Evolutionary Multi-Objective Optimization on Large. Heterogeneous Clusters: An Applications Perspective." Journal of Aerospace Computing Information and Communication. vol. 5. Nov. 2008, 460-478.
Allison Barker, "Aerospace Competes in International Global Trajectory Optimization Competition." Orbiter. vol. 48, No. 3. Mar. 27, 2008, 1 page.
Anonymous, <http://www.apptimation.com/Technology/Technology.html>, 1 page.
Matthew P. Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.
J.B. Kollat et al., "A Computational Scaling Analysis of Multiobjective Evolutionary Algorithms in Long-Term Groundwater Monitoring Applications." Advances in Water Resources. Jan. 25, 2006. 1-24.
J.B. Kollat et al., "Comparing state-of-the-art evolutionary multiobjective algorithms for long-term groundwater monitoring design." Advances in Water Resources 29 (2006): 792-807. <www.elsevier.com/locate/advwatres>.
Kalyanmoy Debet al., "Evaluating the epsilon-Domination Based Multi-Objective Evolutionary Algorithm for a Quick Computation of Pareto-Optimal Solutions." Evolutionary Computation (13)4: 501-525.
Joshua B. Kollat et al., "The Value of Online Adaptive Search: A Performance Comparison of NSGAII, epsilon-NSGAII and epsilonMOEA." Springer-Verlag Berlin Heidelberg 2005. 386-398.
Kalyanmoy Debet al., "A Fast and Elitist Multi-Objective Genetic Algorithm: NSGA-11" KanGAL Report No. 200001. 20 pages.
David A. Van Veldhuizen et al., "Considerations in Engineering Parallel Multiobjective Evolutionary Algorithms." IEEE Transactions on Evolutionary Computation. vol. 7, No. 2, Apr. 2003. 144-173.
Matthew P. Ferringer et al., "Satellite Constellation Design Tradeoffs Using Multiple-Objective Evolutionary Computation." Journal of Spacecraft and Rockets. vol. 43. No. 6, Nov.-Dec. 2006. 1404-1411.
Laumanns, Marco et al.; "Combining Convergence and Diversity in Evolutionary Multi-Objective Optimization"; 2002; Massachusetts Instititute of Technology; Evolutionary Computation 10(3); pp. 1-21.
Deb, Kalyanmoy et al.; "Omni-Optimizer: A generic evolutionary algorithm for single and multi-objective optimization"; 2006; Elsevier; European Journal of Operational Research 185 (2008); pp. 1062-1087.
Ventura, Sebastian et al.; "JCLEC: a Java framework for evolutionary computation"; 2007; Springer-Verlag; pp. 381-392.
Chuang, Angela S. et al.; "An Extensible Genetic Algorithm Framework for Problem Solving in a Common Environment"; 2000; IEEE; Transactions on Power Systems, vol. 15, No. 1; pp. 269-275.
Tan, K. C. et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.
Shajulin Benedict and V. Vasudevan, "Scheduling of Scientific Workflows Using Niched Pareto GA for Grids"; 2006, IEEE pp. 908-912.
David A. Van Veldhuizen et al., "(Final Draft) TR-98-03 Multiobjective Evolutionary Algorithm Research: A History and Analysis" Oct. 14, 1998; pp. 1-30.
Jeffrey Horn, et al.; "A Niched Pareto Genetic Algorithm for Multiobjective Optimization" 1994; IEEE; pp. 82-87.
Mark Erickson et al.; Multi-objective Optimal Design of Groundwater Remediation Systems: Application of the Niced Pareto Genetic Algorithm (NPGA); Advances in Water Resources 25 (2002); pp. 51-65.
Ferringer, Matthew P. "General Framework for the Reconfiguration of Satellite Constellations." <http://etda.libraries.psu.edu/theses/approved/WorldWideIndex/ETD-3537/index.html>, 40 pages.
Related U.S. Appl. No. 13/837,782, filed Mar. 15, 2013.

SYSTEMS AND METHODS FOR VECTOR SCALABILITY OF EVOLUTIONARY ALGORITHMS

FIELD OF THE DISCLOSURE

Aspects of the disclosure are related generally to evolutionary algorithms, and more particularly to systems and methods for utilizing vector scalability for multi-objective optimization problems.

BACKGROUND OF THE DISCLOSURE

The goal of multiple-objective optimization, in stark contrast to the single-objective case where the global optimum is desired (except in certain multimodal cases), is to maximize or minimize multiple measures of performance simultaneously whereas maintaining a diverse set of Pareto-optimal solutions. The concept of Pareto optimality refers to the set of solutions in the feasible objective space that is non-dominated. A solution is considered to be non-dominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff.

When the number of variables for a given optimization problem grows beyond what the current state-of-the-art methods are capable of handling, the problem is often reformulated to reduce the number of variables (through sensitivity analysis perhaps) so that existing methods can be used. For many problems, however, extensive a priori knowledge of the sensitive variables might be too costly to attain or the variable interactions are so highly coupled that reduction of the number of search variables is not possible.

BRIEF DESCRIPTION OF THE DRAWINGS

Reference will now be made to the accompanying drawings, which are not necessarily drawn to scale, and wherein.

DETAILED DESCRIPTION

Figure 1A:
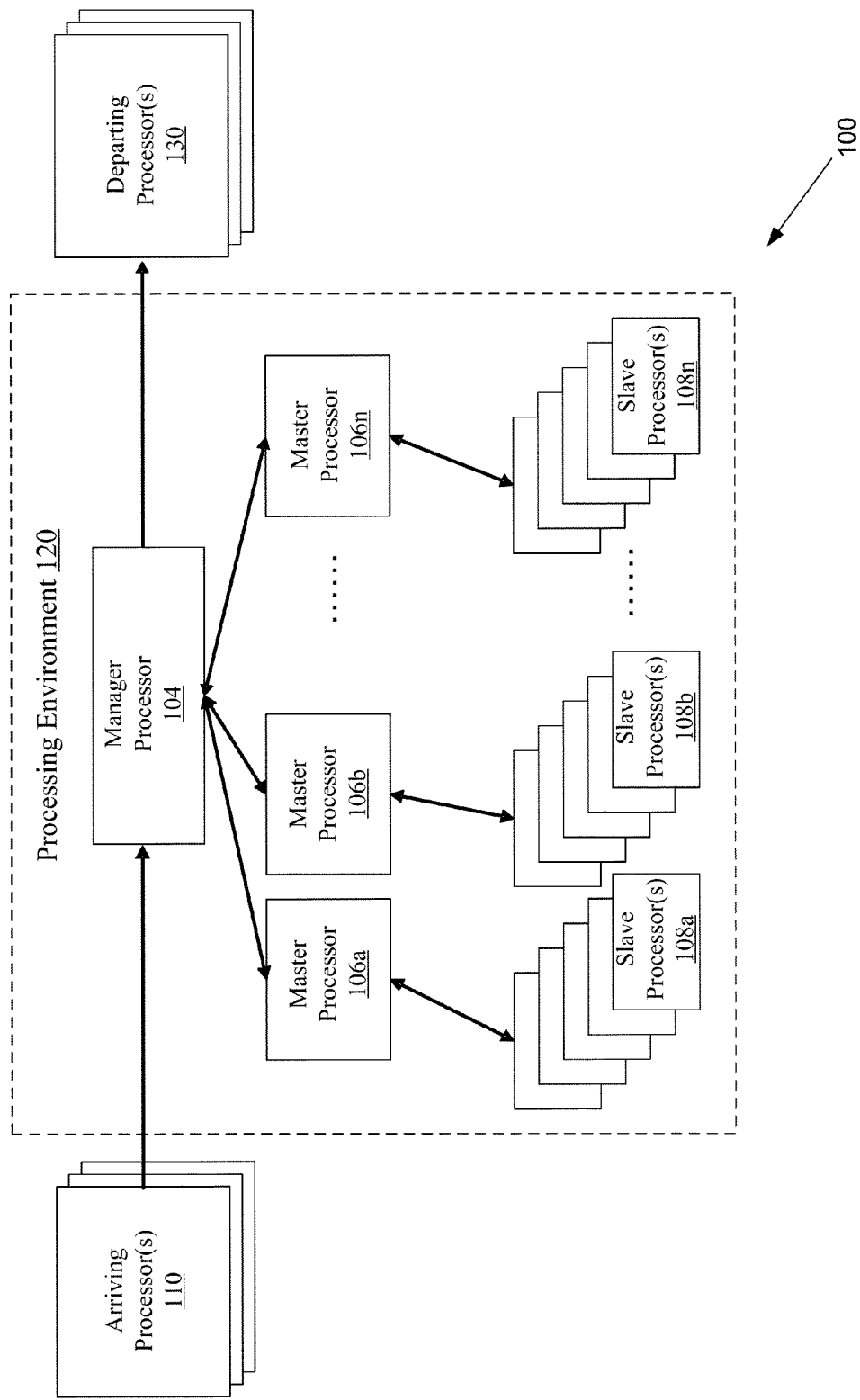
FIG. 1A illustrates an example core management system that supports parallel processing utilized for one or more evolutionary algorithms associated with multi-objective optimization, as described herein, in accordance with embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Embodiments of the disclosure may relate to the use of evolutionary algorithms in optimization problems where the number of variables may be greater than what the current state-of-the-art methods may be configured to solve. Additionally, these evolutionary algorithms may be used to optimization multiple goals and/or objectives. Consider, for example, a search space with 1000 or more variables, in a highly constrained search space. Finding solutions and/or optimizations in such search spaces using current methods may take years, even on the fastest massively parallel computing systems available. Such large search spaces may be present in optimizations related to medium to large satellite clusters, such as optimizations of coverage of the satellite cluster. Another example may involve optimizations to the flight schedules of large airline networks, where it may be desirable to optimize operating profit, fuel usage, and/or the number of flight delays. In many of these large search space optimization problems, initial knowledge about the most sensitive variables may be difficult or costly to acquire. Furthermore, in many of these optimization problems, variable interactions may be so highly coupled that reduction of the number of the search variables may not yield accurate and/or precise solutions to the optimization problem.

The systems and methods of embodiments, as disclosed herein, to address multi-objective optimization problems with a relatively high number of variables may introduce additional variables. A second set of variables, where each variable of the second set may correspond to a respective variable of a first set of variables to be optimized may be introduced. Each of the individual variables of the second set of variables may be of a Boolean type (i.e. they can have a value of one of two possible states, such as '1' or '0'). For example, if a particular optimization problem initially has 1500 variables, the chromosome representing the decision vector space may double to 3000 variables (1500 original genes and 1500 Boolean genes). These additional second set of Boolean variables may be referred to as Boolean flags, Boolean genes, ON/OFF flags, and/or flags.

The flags may, in embodiments of the disclosure, represent variables that may be allowed to be considered as changed relative to a baseline chromosome, or known solution, for the purposes of objective function evaluation for a given function evaluation iteration and/or generation in the evolutionary algorithm. For example, if a particular flag is set to '1,' then the corresponding respective original gene of the first set of genes, may be allowed to be considered as changed relative to the baseline solution chromosome during the execution of the evolutionary algorithm. While, either Boolean value of '0' or '1' may correspond to an indication of a variable that is permitted to change during the given function evaluation, for the ease of discussion, the case where the Boolean value of '1' and/or 'ON' of a flag corresponds to a respective variable that is considered relative to the baseline during the given function evaluation shall be used hereinafter.

A user of the evolutionary algorithm may further be able to specify the maximum number of the original variables that may be allowed to be considered changed relative to the baseline chromosome for any given function evolution iteration. The embodiments of the disclosure provide for executing a process where flags associated with one or more chromosomes may be set and/or modified in accordance with the user input of the maximum number of flags that may be allowed to change for any given function evolution. Therefore, for a particular a chromosome, the number of '1' flags may not exceed the maximum number of the original variables that may be allowed to change for any given function evolution as specified. Furthermore, the user may be able to specify how many flags may be set and, therefore, how many of the genes may be considered relative to the baseline chromosome during objective function evaluation and subsequent non-domination sorting, but not which particular genes may be considered for the same.

The decision vector variables (genes) corresponding with a '0' flag associated with them may be effectively removed as variables to be considered within the search space for that objective function evaluation cycle, while those variable corresponding with a flag set to '1' may be considered for that cycle of objective function evaluation. It will be appreciated that from one objective function evaluation to the next, the particular variable that may be considered within the search space may vary; however, the maximum number of variable that may be considered will not vary and may be fixed by the specified maximum number of the original variables that may be allowed to change for any given function evolution. Indeed, in certain embodiments the baseline chromosome, to which the objective function evaluation variables are referenced, may also change form one objective function evaluation cycle to the next.

Since the Boolean flags are themselves variables in the chromosome, the methods disclosed herein may allow the evolutionary algorithms to find the most significant variables, or coupling of variables on the multi-objective function values. In other words, the systems and methods disclosed herein may be relatively effective in identifying the genes that are relatively more influential in the value of one or more, or a collection of objective function values. Another way to think about this is that by searching a very small percentage of the overall design space with each chromosome enabling the evolutionary algorithm to find the fundamental building blocks of the best solutions while ignoring the "noise" that may have variable values with only a marginal and/or no impact on improving the objective function values. The advantages of identifying the most critical variables in the solution to the relatively large optimization problem may have a variety of effects, including greater ease of implementation of the optimized solution and/or greater impact. Further still, the systems and methods disclosed herein may enable faster and/or more practical solutions to optimization problems with a large set of variables.

When applying this scale reduction method for a multi-objective optimization with an evolutionary algorithm, it may be assumed that the original variables start from a known baseline. If no known baseline exists, the evolutionary algorithm may utilize a "vastly infeasible search space" mechanism to establish a starting known baseline solution. The vastly infeasible search space mechanism is described in at least, commonly owned U.S. patent application Ser. No. 12/550,858, filed on May 12, 2010 and titled "Systems and Methods for Generating Feasible Solutions form Two Parents for an Evolutionary Process", the contents of which, in its entirety, is incorporated herein by reference.

The systems and methods as further disclosed herein, in accordance with embodiments of the disclosure, may enable master processors or other suitable entities involved in the execution of the evolutionary algorithm to perform a scale reduction operation on one or more chromosomes. These one or more chromosomes may be child chromosomes that may be produced as a result of selection, crossover, and/or mutation of an initial set of chromosomes. The initial, also referred to as parent, set of chromosomes may have one or more initial chromosomes, where each of the one or more initial chromosomes may include a first set of genes associated with the optimization problem to be solved and a second set of genes corresponding to the Boolean flag, where each of the genes of the first set of genes correspond to a respective gene of the second set of genes. The second set of genes (flags) may indicate which of the first set of genes may be allowed to change for a current function evaluation. In certain embodiment, the evolutionary algorithms and associated systems may be provided with the first set of genes and the evolutionary algorithms and associated systems may add the second set of genes, or flags, to the received chromosomes to enable the systems and methods as disclosed herein.

It will be appreciated that the children of the initial set of chromosomes may also have the same number of first and second (flag) genes. However, the values of the genes, after the processes of selection, crossover, and/or mutation, may be different for the children compared to the initial chromosomes. It will also be appreciated that while the initial set of chromosomes may comply with the total number of flags set to a maximum specified number, some or all of the one or more child chromosomes may not comply with the total number of flags set to a maximum specified number after the processes of selection, crossover, and/or mutation.

The master processors, or other suitable entities of the systems disclosed herein may then perform the scale reduction process on the child chromosomes as produced from the initial set of chromosomes. Upon execution of the scale reduction process, the resultant one or more chromosomes for evaluation may have no more than the maximum specified number of flags set to '1,' indicating the maximum number of genes permitted to be considered as changed from a baseline chromosome during the current iteration of the function evaluation.

The child chromosomes after the scale reduction function may be provided to an asynchronous evolution and automated bundling process that may bundle one or more of the children as well as one or more of the parents and provide the bundles of chromosomes to one or more slave processors for one or more evaluation and timing operations. The operations performed may be performed in accordance with the flags that are set in each of the chromosome and indicative of the genes that are considered relative to the baseline chromosome for the purposes of objective function evaluation during the evaluation and timing operations.

The scale reduction process may entail receiving a number (N) of child chromosomes from the selection, cross-over, and/or mutation processes. These N child chromosomes may have the first set of genes, as well as, the ON/OFF flag genes corresponding to each of the genes of the first set of genes. One of the chromosomes from the children chromosomes may be selected for the scale reduction process. The selected child population may be analyzed to determine how many of the flags should be modified, such that the selected chromosome conforms to the maximum number of genes that may be evaluated in the current evaluation cycle. Next a candidate list of the flags to be changed is generated. In some cases, this candidate list may include all or a subset of the flags that are set to 'ON' or '1.'

Next, one of the genes in the candidate list may be selected. The selection of the gene among the candidate list of genes may be performed by applying a probability distribution, such as a uniform distribution. In the case of the uniform distribution, each of the genes of the candidate list may be equally likely to get selected. Once a gene is selected, a mutation operator may be applied on that gene. This mutation operator may flip the gene form an 'ON' to an 'OFF' with some probability in the range of 0 to 1. It may then be determined if the gene has flipped and if it has, then that gene may be removed from the candidate list of flags that may be changed. If the gene has not changed after the mutation operator, then that gene may remain among the candidate list of genes that may be changed.

It may then be determined if the total number of '1' or 'ON' genes are less than or equal to the specified total maximum number of genes that may be evaluated in relation to the baseline chromosome in any given evaluation cycle. If it is not, then the gene selection, mutation, and evaluation of the number of 'ON' genes may be repeated iteratively until the selected chromosome has a total number of 'ON' genes at or below the specified total maximum number of genes that may be evaluated in any given evaluation cycle. If however, it is determined that the 'ON' genes of the selected chromosome are now in accordance with the specified total maximum number of genes that may be evaluated relative to the baseline chromosome in any given evaluation cycle, then the next chromosome of the N total child chromosomes may be selected for scale reduction. All of the N child chromosomes may be iteratively subjected to the scale reduction process such that all of the chromosomes are in accordance with the specified total maximum number of genes that may be evaluated in any given evaluation cycle.

When all of N child chromosomes, after the scale reduction process, have no more than the specified total maximum number of genes that may be evaluated in any given evaluation cycle flag genes turned on, the new scale modified child chromosomes may be ready for evaluation. At this point the child chromosomes may be provided to an asynchronous evolution and bundling process, which in turn may provide bundles of the child chromosomes, along with parent chromosomes, to evaluation and timing processes.

I. Core Management System

FIG. 1A illustrates an example core management system 100 that supports parallel processing utilized for one or more evolutionary algorithms associated with multi-objective optimization, as described herein, according to example embodiments of the disclosure. As shown in FIG. 1A, there may be a processing environment 120 in which processing associated with one or more evolutionary algorithms is managed and performed. The processing environment may include one or more manager processor computers 104 (also referred to as "manager processors"), master processor computers 106a-n (also referred to as "master processors"), and slave processor computers 108a-n (also referred to as "slave processors").

The manager processor 104 may be operative to dynamically configure and reconfigure the processing environment 120. In general, the manager processor 104 may make a dynamic determination of how many master processors 106a-n are needed, and how many slave processor(s) 108a-n are needed for each master processor 106a-n. The determination of the number of slave processor(s) 108a-n per master processor 106a-n may be based upon a master calibration algorithm, as will be discussed in further detail herein.

During initial set-up or configuration of the processing environment 120, the manager processor 104 may identify a number of available arriving processor(s) 110 having processing capacity. These arriving processor(s) 110 may be available for utilization, perhaps as a result of another application processing being completed. The manager processor 104 may configure one or more of the arriving processor(s) 110 as master processors 106a-n. Each master processor 106a-n may be responsible for one or more operations associated with a particular portion of the evolutionary algorithm. The manager processor 104 may also configure and assign one or more of the arriving processor(s) 110 as the respective one or more slave processors 108a-n of the respective master processor 106a-n. The slave processors 108a-n may likewise carry out one or more operations as instructed by the respective master processor 106a-n.

Subsequent to the initial-setup or configuration, the manager processor 104 may also be operative to dynamically reconfigure the processing environment 120. As an example of such reconfiguration, additional arriving processor(s) 110 may be identified by the manager processor 104 as being available while the processing environment 120 is in operation. Accordingly, the manager processor 104 may assign roles to the additional arriving processor(s) 110. For example, an additional arriving processor 110 may be assigned to a role as a manager processor 104, a master processor 106a-n, or a slave processor(s) 108a-n. On the other hand, one or more master processors 106a-n or slave processor(s) 108a-n in the processing environment 120 may become exhausted (e.g., allocated processing time has been reached), and may need to be removed from the processing environment 120 as a departing processor(s) 130. The departing processor(s) 130 may be a manager processor 104, a master processor 106a-n, or a slave processor 108a-n that has experienced a processing failure or that has otherwise been requested by a higher priority application.

In an example embodiment of the disclosure, a manager processor 104 that is exhausted may remove itself from the processing environment 120. The departing manager processor 104 may be operative to nominate its replacement, perhaps from an arriving processor 110, an existing master processor 106a-n, or an existing slave processor 108a-n. According to another example embodiment, a master processor 106a-n that is exhausted may need to be removed from the processing environment 120. The removed master processor 106a-n may likewise nominate its replacement, perhaps from another master processor 106a-n or an existing slave processor 108a-n. Alternatively, the manager processor 104 may determine the replacement for the removed master processor 106a-n. In addition, a slave processor(s) 108a-n that is exhausted may need to be removed from the processing environment 120, according to an example embodiment of the disclosure. The master processor 106a-n may replace the removed slave processor(s) 108a-n with an arriving processor(s) 110 when possible and needed, according to an example embodiment of the disclosure. The master processor 106a-n may inform the manager processor 104 of the removal of a slave processor(s) 108a-n and/or its replacement.

As introduced above, the manager processor 104 may determine the number of master processors 106a-n needed, and/or the number of slave processor(s) 108a-n needed per master processor 106a-n in accordance with an example master calibration algorithm. It will be appreciated that a manager processor 104 may utilize an example master calibration algorithm in a variety of instances, e.g., based upon arriving processor(s) 110 or departing processor(s) 130, or when one or more master processor processors 106a-n report that it has too many or too few slave processors(s) 108a-n.

In an example embodiment of the disclosure, a goal of a master processor 106a-n may be to keep the associated slave processors 108a-n fed with work as efficiently as possible. When a slave processor 108a-n requests work from the master processor 106a-n (e.g., sends a packet with results from evaluating the previously received chromosome data structure), the master processor 106a-n is most efficient in responding to the slave processor 108a-n when it is waiting for the packet (e.g., the master processor 106a-n is not busy doing other things).

Figure 1B:
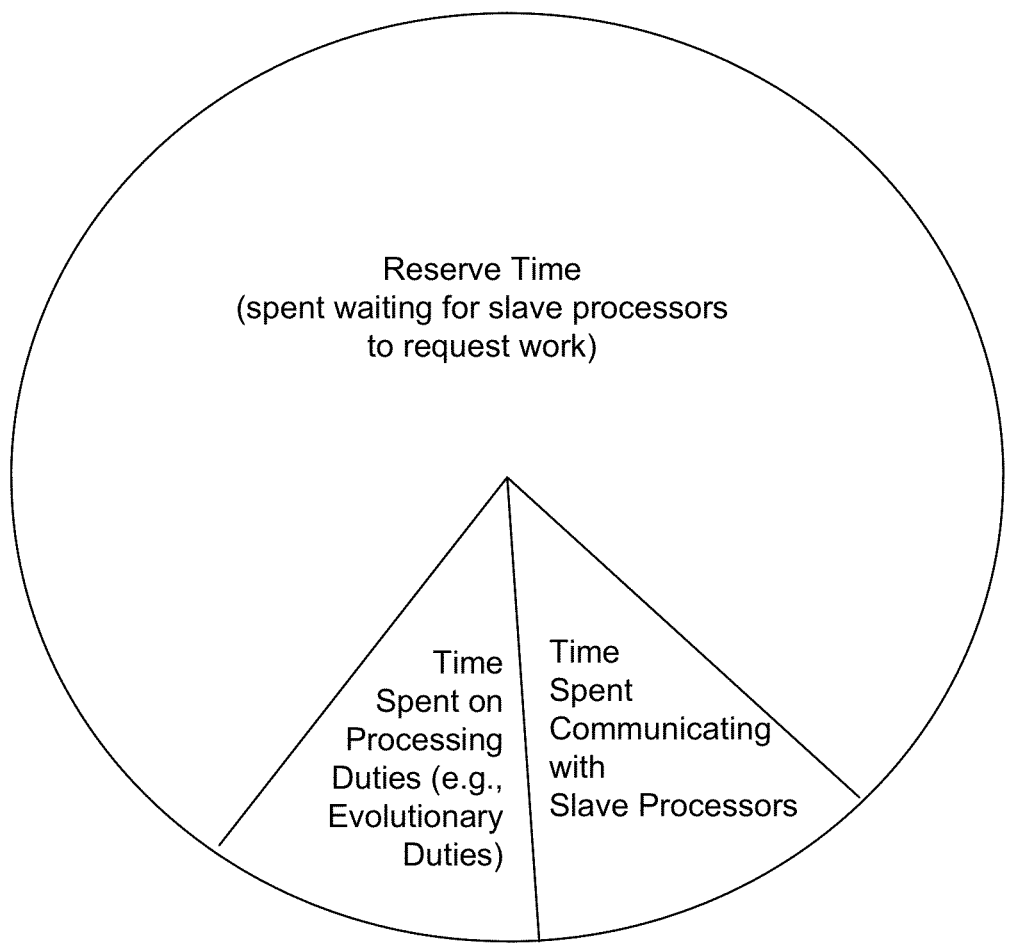
FIG. 1B illustrates an example master processor timing chart, in accordance with embodiments of the disclosure.

As shown by the master processor timing chart in FIG. 1B, the "Reserve Time" is the time that the master processor 106a-n is waiting for work. If there is too much Reserve Time, then the master processor 106a-n has capacity to handle more slave processors 108a-n. As the number of slave processors 108a-n increases for a particular master processor 106a-n, the total time spent by a master processor 106a-n performing processing (e.g., evolutionary duties) increases, as does the total time spent communicating with slave processors 108a-n. Therefore, the master calibration algorithm may use the current timing data to estimate how many slave processors 106a-n would bring the Reserve Time into compliance with a Reserve_Time_Percentage threshold, as described below.

For purposes of utilizing the master calibration algorithm, each master processor 106a-n may maintain timing data associated with available processing resources at the master processor 106a-n. In an example embodiment of the disclosure, the timing data maintained by each master processor 106a-n may include the following data:

A total elapsed time in which the particular master processor 106a-n has been in operation (Total_Elapsed_Time);

A total time that the particular master processor 106a-n spends communicating with associated slave processor(s) 108a-n to send work and receive results (Total_Time_Communicating_with_Slaves); and A total time spent by a master processor 106a-n performing processing (e.g., evolutionary duties or operations) in accordance with one or more evolutionary algorithms (Total_Time_Spent_Performing_Processing_Duties).

Using the timing data, the manager processor 104 or each master processor 106a-n may be able to calculate a target number of slave processor(s) 108a-n that it can handle in accordance with the master calibration algorithm. In an example embodiment of the disclosure, the target number of slave processor(s) 108a-n ("Target_Number_of_Slaves") for a particular master processor 106a-n can be determined according to the following calculations:

Target_Reserve_Time=Reserve_Time_Percentage* Total_Elapsed_Time. In an example embodiment of the disclosure, the Reserve_Time_Percentage may be set between 10% (0.10)–20% (0.20), perhaps at 15% (0.15), so that the particular master processor 106a-n may retain some reserve processing capability. However, it will be appreciated that other values may be utilized for the Reserve_Time_Percentage without departing from example embodiments of the disclosure.

Average_Time_Communicating_With_Slaves= Total_Time_Communicating_with_Slaves/Number_Chromosomes_processed, where the Number_Chromosomes_processed represents the number of chromosomes processed within the Total_Elapsed_Time.

Average_Time_Spent_On Processing_Duties=Total_Time_Spent_Performing_ Processing_Duties/Number_Chromosomes_processed.

Target_Number_of_Slaves=((Total_Elapsed_Time−Target_Reserve_Time)/(Average_Time_Communicating_ with_Slaves+Average_Time_Spent_On_Processing_Duties))*(Current_Number_of_Slaves/Number_Chromosomes_processed), where the Current_Number_ of_Slaves represents the current number of slave processor(s) 108a-n assigned to the particular master processor 106a-n.

If any master processor 106a-n does not have the calculated Target_Number_of_Slaves, then an example reallocation algorithm may be invoked by the manager processor 104. An example reallocation algorithm may initiate with a manager processor 104 requesting that each master processor 106a-n provide the manager processor 104 with its respective calculated Target_Number_of_Slaves and its respective actual number of slave processor(s) 108a-n that has been assigned to the respective master processor 106a-n. The manager processor 104 may then determine whether any master processor 106a-n is underweighted or overweighted with respect to calculated Target_Number_of_Slaves. In particular, a master processor 106a-n is underweighted with respect to slave processor(s) 108a-n if the actual number of slave processor(s) 108a-n is less than the calculated Target_Number_of_Slaves. Likewise, a master processor 106a-n is overweighted with respect to slave processor(s) 108a-n if the actual number of slave processors is more than the calculated Target_Number_of_Slaves.

If one or more master processors 106a-n are overweighted with respect to the calculated Target_Number_of_Slaves, then slave processor(s) 108a-n associated with the overweighted master processors 106a-n may be reallocated to underweighted master processors 106a-n. Likewise, underweighted master processors 106a-n may also be provided one or more arriving processor(s) 110 for use as slave processor(s) 108a-n. Once all the master processors 106a-n meet their respective Target_Number_of_Slaves, then the manager processor 104 may designate a portion of any remaining arriving processor(s) 110 as new master processors 106a-n, where each new master processor 106a-n receives a default number of arriving processor(s) 110 for use as slave processor(s) 108a-n.

It will be appreciated that the processing environment 120 described herein may accommodate a large number of processors. Indeed, the processing environment may easily utilize over 25,000 processors without any significant loss in processing efficiency, according to an example embodiment of the disclosure.

Figure 1C:
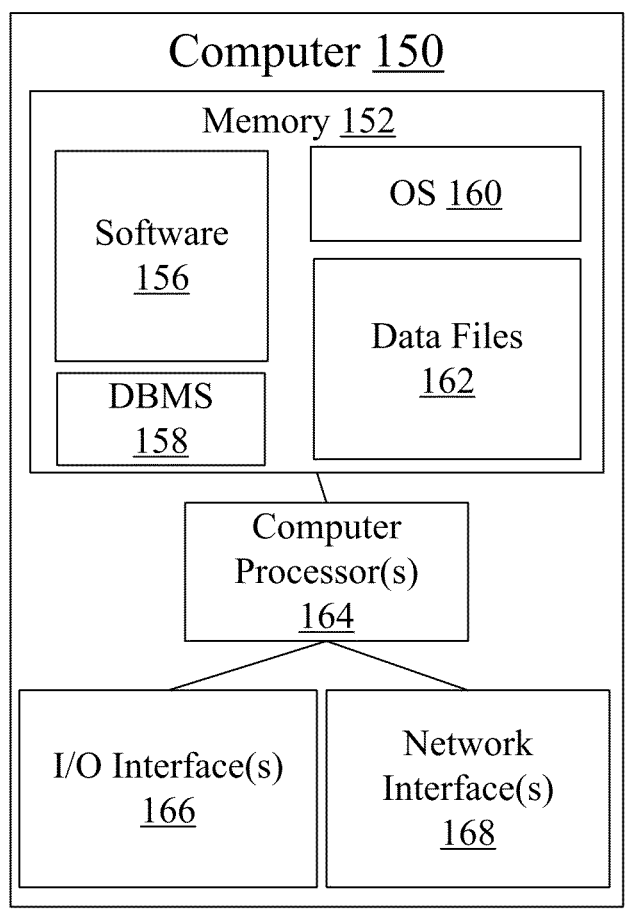
FIG. 1C illustrates an example computer for implementing one or more of the processors in FIG. 1A, in accordance with embodiments of the disclosure.

The processors described in FIG. 1A, including the processors 104, 106a-n, 108a-n, 110, and 130, may implemented using the computer 150, or a variation thereof, illustrated in FIG. 1C. The computer 150 may be any processor-driven device, such as, but not limited to, a personal computer, laptop computer, server computer, cluster computer, and the like. In addition to having one or more computer processor(s) 164, the computer 150 may further include a memory 152, input/output ("I/O") interface(s) 166, and network interface(s) 168. The memory 152 may be any computer-readable medium, coupled to the computer processor(s) 164, such as RAM, ROM, and/or a removable storage device for storing data files 162 and a database management system ("DBMS") 158 to facilitate management of data files 162 and other data stored in the memory 152 and/or stored in separate databases. The memory 152 may also store various program modules, such as an operating system ("OS") 160 and software 156. The software 156 may comprise one or more software programs and/or instructions for managing, configuring, or performing one or more operations of an evolutionary algorithm, according to an example embodiment of the disclosure. The software 156 may further comprise one or more software programs and/or instructions for managing, configuring, or performing one or more operations of an evolutionary algorithm with scale reduction, in accordance with example embodiments of the disclosure.

The I/O interface(s) 166 may facilitate communication between the computer processor(s) 164 and various I/O devices, such as a keyboard, mouse, printer, microphone, speaker, monitor, bar code readers/scanners, RFID readers, and the like. Likewise, the network interface(s) described herein may take any of a number of forms, such as a network interface card, a modem, a wireless network card, and the like.

Numerous other operating environments, system architectures, and device configurations are possible, beyond those illustrated in FIGS. 1A and 1C. Other system embodiments can include fewer or greater numbers of components and may incorporate some or all of the functionality described with respect to FIGS. 1A and 1C. Accordingly, embodiments of the disclosure should not be construed as being limited to any particular operating environment, system architecture, or device configuration.

II. Parallel Processing Optimization with Scale Reduction

A. System Overview

Figure 2:
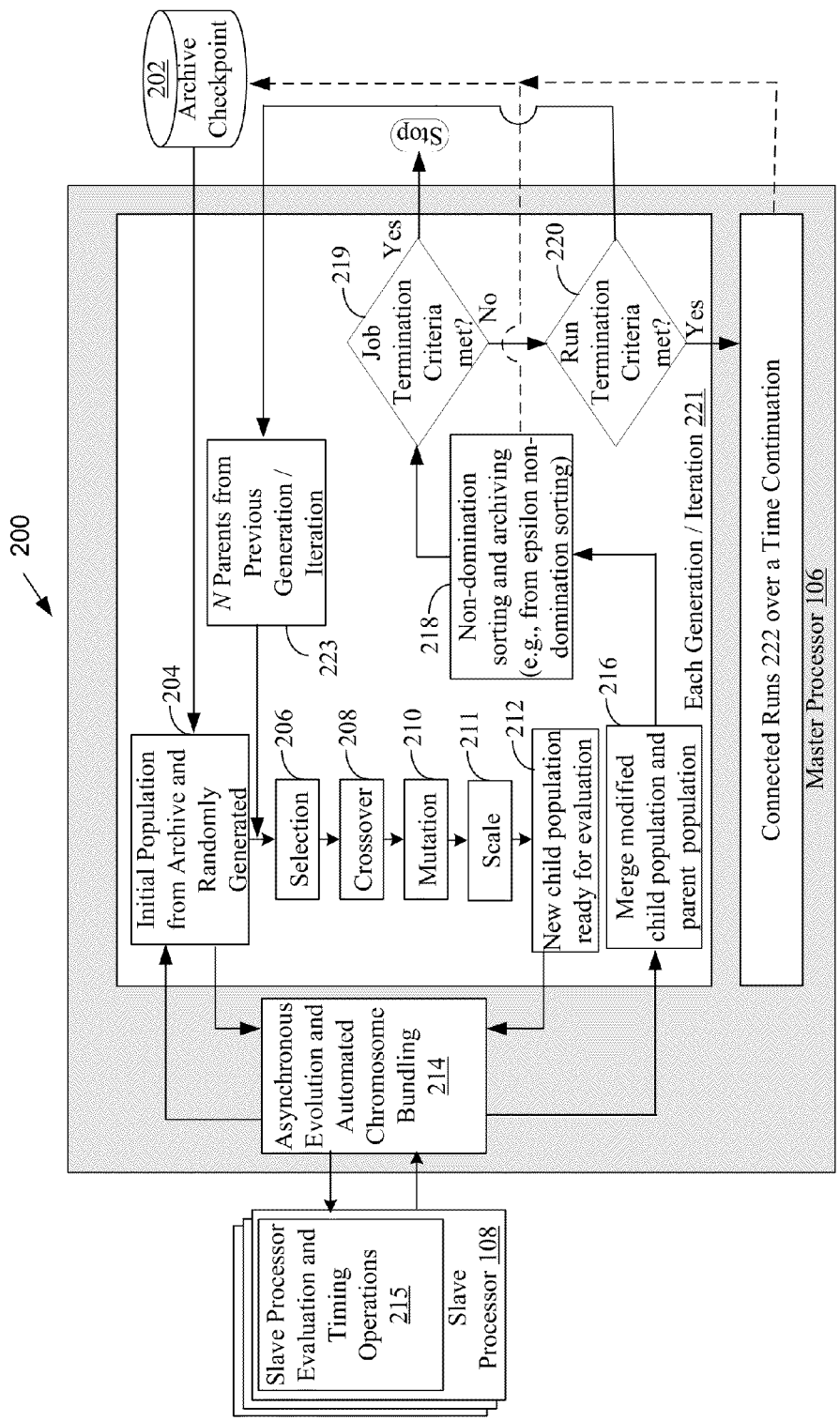
FIG. 2 illustrates an example parallel processing system that executes an evolutionary algorithm, in accordance with embodiments of the disclosure.

FIG. 2 illustrates an example parallel processing system 200 that executes an evolutionary algorithm with decision vector scalability, according to an example embodiment of the disclosure. As shown in FIG. 2, a first portion of the evolutionary algorithm may be performed by a master processor 106 while a second portion of the evolutionary algorithm may be performed by one or more slave processors 108, as discussed herein.

In an example embodiment of the disclosure, an executed job of the evolutionary algorithm may comprise a plurality of connected runs 222 that occur in a sequence to form a time continuation. Each run 222 may comprise one or more evolutionary operations performed during one or more generations/iterations 221. It will be appreciated that a run may be connected to a prior run in that at least some of the same parents are shared in the "initial population" utilized for initiating respective runs, according to an example embodiment of the disclosure.

Example processing by an executed job of the evolutionary algorithm will now be discussed in further detail. Referring now to block 204, the master processor 106 may receive or obtain an initial population of parent chromosome data structures. In an example embodiment of the disclosure, each parent chromosome data structure may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Math Variable (Math 1517): A variable may be derived based upon an equation using operands comprising either constants or variables that specify values from other elements specified. The variable names may follow the name convention <alphabetic character><number>, where the <alphabetic character> may specify the column position of elements within an array and/or spreadsheet, and the <number> may specify the row position within the array and/or spreadsheet. It will be appreciated that a math variable may be a fixed or constant value (double precision or integer precision).

Function Variable (Function 1518): A variable may be produced by a function call, which may include calling arguments of a plurality of other constants, and variables.

Any one of the static variables, evolved variables, the derived variables, the math variables, and/or the function variables may be of a variety of types including, but not limited to, integer, double precision, characters, Boolean (two possible values, e.g. 'ON' or 'OFF'; '0' or '1'; 'TRUE' or 'FALSE'), pair of double precision numbers pair of integers array of double precision numbers, array of integers file/spreadsheet, and/or Gaussian.

Still referring to block 204, the initial population of parent chromosome data structures may be obtained by one or more sources. In an example embodiment of the disclosure, the initial population of parent chromosome data structures may be obtained from a combination of the archive checkpoint 202 and random generation of new chromosome data structures. The archive checkpoint 202 may include a known solution, such as an experiential solution. As a non-limiting example, 25% of the initial population of parent chromosome data structures may be obtained from the archive checkpoint 202 while 75% of the initial population may be randomly generated. The chromosomes obtained from the archive checkpoint 202 may have previously been evaluated in accordance with the objective functions. 'ON' the other hand, the randomly generated chromosomes may not have been evaluated in accordance with the objective functions, and thus, they may be delivered to block 214, which allocates the chromosomes to the slave processors 108 for objective function evaluation by block 215. In certain embodiments, the initial population of parent chromosomes may include one or more known solutions, or a baseline solution, provided to the parallel processing system 200.

In certain cases, if no known baseline exists, the evolutionary algorithm may utilize a "vastly infeasible search space" mechanism to establish a starting known baseline solution. The vastly infeasible search space mechanism is described in at least, commonly owned U.S. patent application Ser. No. 12/550,858, filed 'ON' May 12, 2010 and titled "Systems and Methods for Generating Feasible Solutions form Two Parents for an Evolutionary Process", the contents of which, in its entirety, is incorporated herein by reference.

The archive checkpoint 202 may include an elite set of chromosome data structures (i.e., elite solutions) obtained from one or more prior generations/iterations 221, according to an example embodiment of the disclosure. Initially, the archive checkpoint 202, in certain embodiments, may be populated with one or more known solution chromosomes, such as a baseline chromosome solution. Alternatively, if no baseline solution is known, the archive checkpoint may initially be populated with a derived known solution using a variety of suitable mechanisms, such as vastly infeasible search space mechanism. The archive checkpoint 202 may take the form of a data file or database stored in a computer memory, computer disk, network storage, or other non-volatile memory. In accordance with embodiments of the disclosure, the archive checkpoint 202 may contain one or more elite set of chromosomes, such as known solutions, that have a first set of genes and a second set of genes. The first set of genes may correspond to variable of the solution to be evaluated and/or optimized. The genes of the first set of genes may be of any suitable type, such as an integer, double precision, or the like. The second set of genes may include Boolean flags (also referred to as Boolean genes, Boolean variable, or flags). Each Boolean flag may correspond to each of the genes of the first set of genes. Therefore, there may be one corresponding respective gene, or flag, in the second set of genes for every gene in the first set of genes. The flags may indicate if the corresponding respective gene of the first set of genes are to be evaluated as changed relative to a baseline chromosome in the current run of the evolutionary algorithm by the parallel processing system 200. In other words, the flags may be set to control which of the first set of genes may be evaluated in one or more objective functions, such as for the purposes of non-domination sorting and evaluation, in a particular generation and/or iteration of the evolutionary algorithm.

Archived chromosome data structures that were previously evaluated in a prior generation/iteration 221 may be associated with a plurality of objective function values corresponding to a respective plurality of objective functions. Each objective function may be associated with any predefined objective to be optimized by the executed job of the evolutionary algorithm. For example, in a satellite constellation coverage optimization, an objective function may be associated with the objective of maximizing global coverage, and a corresponding objective function value may indicate which chromosome data structure (based upon the included chromosome and its respective genes) is able to achieve the greatest amount of global coverage. It will be appreciated that in many cases, there may be multiple objectives. For example, in an airline flight schedule, objective functions may be associated with optimizing revenue, profit, delayed legs, and/or fuel consumption. It will further be appreciated that in some cases, one or more of the objectives may not be independent of each other. Indeed, the objective functions may have non-zero correlation to each other. It will yet further be appreciated that the objective functions may be of any suitable variable type, such as integer, double precision, characters, Boolean, or the like. Continuing with the previous example, the revenue objective function and the fuel consumption objective function may generate a double precision value, while the delayed leg objective function may generate an integer value.

Alternatively, in block 204, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 214, which allocates the chromosomes to the slave processors 108 for objective function evaluation by block 215. In certain embodiments, the objective function evaluation may be performed 'ON' the genes corresponding to flags that are turned 'ON' and indicative of genes that may be evaluated during a particular round of evaluations. Therefore, the total number of genes that may be evaluated in a chromosome in a particular evaluation process may be specified, such as by user input. Once the objective function evaluations evaluation in block 215 have been completed, and the objective function values have been received in block 214, then each of the randomly generated parent chromosome data structures may be associated with a respective plurality of objective function values.

Having received or obtained the initial population of parent chromosome data structures in block 204, processing may then proceed to block 206. In block 206, the master processor 106 may select pairs of parent chromosome data structures from the input population of parent chromosome data structures. In an example embodiment of the disclosure, the selection of the pairs of parent chromosome data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two parents resulting from the selection process of block 206. It will be appreciated that a predetermined number of pairs of parent chromosome data structures may be selected in block 206. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

Following block 206, the chromosomes in selected pairs of parent chromosome data structures may be subject to one or more evolutionary operators to generate a plurality of child chromosome data structures, according to an example embodiment of the disclosure. Two example evolutionary operators are illustrated by blocks 208 and 210. For example, block 208 illustrates a crossover evolutionary operator in which a portion of the parameter values or "gene" values may be exchanged between chromosomes in selected pairs of parent chromosome data structures to generate new pairs of chromosome data structures. In an example embodiment of the disclosure, the crossover evolutionary operation may be capable of performing crossover using integer or non-integer numbers (e.g., double precision numbers, etc.), binary representation of numbers, letters, and/or symbols. Furthermore, the crossover evolutionary operator may be used for crossover of the binary flag genes that indicate corresponding respective genes that may be evaluated in any given evaluation iteration. As another example, block 210 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the disclosure, only a portion or percentage of the received chromosomes in the chromosome data structures in blocks 208 and 210 may have their genes crossed-over or mutated, respectively. The respective portions or percentages that are crossed-over and/or mutated may be predetermined or dynamically varied during operation of the evolutionary algorithm, according to an example embodiment of the disclosure. For example, a first predetermined portion or percentage (e.g., 50%-80%) of the received chromosomes of the chromosome data structures may have genes that are crossed over in block 208 while a second predetermined portion or percentage (e.g., 1%-3%) of the received chromosomes of the chromosome data structures may have genes that are mutated in block 210. 'ON' the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 208 and 210 may be available without departing from example embodiments of the disclosure. Likewise blocks 208 and 210 may be performed in a different order than that shown in FIG. 2 or otherwise combined into a single block without departing from example embodiments of the disclosure. Further still, it will be appreciated that the evolutionary operators 206, 208, 210 may be applied and may evolve both the first set of genes of the parent chromosomes, as well as the second set of genes in the form of Boolean flags linked to the first set of chromosomes. Indeed a particular gene from the first set of genes of the chromosome may evolve with the application of the evolution operations 206, 208, 210, substantially independently from the corresponding respective one of the flags from the second set of genes.

Following the evolutionary operators of blocks 206, 208, and 210, the resulting child chromosomes may be provided to a scale reduction operation at block 211. The operation of block 211 is described in more detail in conjunction with FIG. 3. The scale reduction operation 211 ensures that the child chromosomes produced after operation 206, 208, and 210 are constrained by a maximum specified number of genes that may be evaluated in any given evaluation iteration of the evolutionary algorithm. In other words, the flags indicative of which genes of the child chromosome data structures are permitted to be evaluated in the current iteration may not number more than a specified level after the vector scale reduction operation of block 211.

After the evolutionary operations of block 206, 208, and 210 and the scale reduction operation of block 211, a new population of child chromosome data structures may be obtained in block 212. Following block 212, processing may proceed to block 214. In block 214, the new population of child chromosome data structures may be received into a "To Evaluate" list or queue (see also FIG. 4A, which illustrates block 214 in further detail). Block 214 may then allocate the chromosome data structures from the "To Evaluate" list or queue to the plurality of slave processors 108 according to an asynchronous evolution process. An automated chromosome bundling process, discussed in further detail with respect to FIG. 4A, may also be utilized in block 214 to determine how many chromosome data structures should be included in a respective chromosome bundle for a respective slave processor 108. For example, a slave processor 108 with faster processing capability may receive a chromosome bundle with a larger number of chromosome data structures. Alternatively, the slave processor 108 may receive a fixed number of chromosome data structures in a chromosome bundle, but simply receive a larger number of chromosome bundles within a predetermined amount of time. The example automated chromosome bundling process may allow efficient allocation of chromosome data structures among the plurality of slave processors 108. In some cases, the number of flags, indicating the number of genes that are permitted to be considered as deviating from the baseline solution chromosome, may be considered in the bundling process.

In block 215, each slave processor 108 may have received a chromosome bundle comprising one or more chromosome data structures from the master processor 106. Additionally, in certain embodiments, the slave processors 108 may further receive a baseline chromosome, representing a known solution. The slave processors 108 may be homogenous or heterogeneous in processing capability. Each slave processor 108 may evaluate, in accordance with a plurality of objective functions, the received chromosome bundle of chromosome data structures, and/or the baseline solution chromosome to generate a plurality of respective objective function values for each chromosome data structure in block 215. In addition, each slave processor 108 may also perform timing operations or calculations, including determination of certain wait times and/or evaluation times associated with the respective slave processor 108, in block 215. It will be noted that in certain embodiments, each slave processor 108 may evaluate the objective functions based only 'ON' the genes that are allowed to be considered to deviate from the baseline chromosome in any given evaluation iteration or generation and indicated by the corresponding flag turned ON. As each slave processor 108 finishes the objective function evaluations and/or timing operations in block 215, the slave processor 108 may provide a results bundle (e.g., objective function values) and timing data (e.g., wait times and/or objective function evaluation times) to the master processor 106. The master processor 106 may provide the received objective function values as well as an identification of the corresponding evaluated child chromosome data structures to a "Finished" list or queue. It will be appreciated that with asynchronous evolution processing, the objective function results may be included in the "Finished" list or queue 'ON' an as-received basis from the slave processor 108. Indeed, the evolutionary process may be asynchronous in that as soon as the "To Evaluate" list is empty for a given generation/iteration 221, the processing taking place in block 214 is completed, where the child population passed to block 216 is comprised of all of the chromosome data structures currently within the "Finished" list. It will be further appreciated that the results from some of the chromosome bundles previously sent to the various slave processors 108 may not have been received at the time the "To Evaluate" list is emptied. These may be referred to as late chromosome data structures from one or more prior generations/iterations.

In block 216, the master processor 106 may receive a modified child population of chromosome data structures from the asynchronous evolution process of block 214. In certain embodiments, the modified child population may include different chromosome structures as well as a different number of chromosome data structures as compared to the child population of block 212. The received modified child population is merged with the current parent population, as illustrated by block 216. In block 218, the master processor 106 may perform non-domination sorting (e.g., based off of an epsilon vector) of the merged list of child and parent chromosome data structures to identify an elite set of chromosome data structures based at least in part 'ON' the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.
Condition 2: The solution $x_1$ is strictly better than $x_2$ in at least one objective.

If both conditions 1 and 2 are satisfied, then all of the following statements are substantially equivalent:
$x_2$ is dominated by $x_1$,
$x_1$ is non-dominated by $x_2$, or
$x_1$ is non-inferior to $x_2$.

Accordingly, non-domination sorting in block 218 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the disclosure, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 202 or another archive of a computer memory or other data storage for subsequent retrieval.

Following processing in block 218, processing may proceed to block 219. In block 219, a determination is made as to whether the current job is completed such that the evolutionary algorithm should be terminated. A job typically comprises processing involving a plurality of connected runs 222, where each run 222 may include processing associated with one or more generations/iterations 221. Block 219 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria (see, e.g., FIGS. 5A-5F). It will be appreciated that the obtained solutions comprising the chromosome data structures may be output in a variety of formats, including a database format, a comma separated value (CSV) format, or a graphical format.

If block 219 determines that the job is not complete, then processing may proceed to block 220 to determine whether the current run 222 has completed. In determining whether the current run is complete, block 220 may determine whether a current run 222 has failed to produce improvement in quantity and quality of the solutions generated from the prior iterations/generations 221. The quantity measure may be based upon the number of solutions. The quality measure may be based 'ON' some quantification of distance from a utopia point, box fitness (e.g., described with respect to FIGS. 5A-5F), or yet another measure.

If block 220 determines that a current run 222 is not complete, then processing may proceed to block 223, wherein a population of parent chromosome structures may be obtained or otherwise selected from the elite chromosome data structures determined from block 218. The prior process is then repeated for another generation/iteration 221 using the parent chromosome data structures from the prior generation/iteration. It will be appreciated that because the evolution process of block 214 is asynchronous, there may be one or more late child chromosome data structures received in the "Finished" list or queue in 216 that are associated with one or more pairs of parent chromosome data structures allocated to slave processors 108 during one or more prior generations/iterations. Therefore, in the next generation/iteration 221, the merged children chromosome data structures in block 216 may likewise include those late child chromosome data structures as well as current child chromosome data structures from parent chromosome data structures allocated to slave processors 108 during the current generation/iteration 221.

On the other hand, block 220 may determine that a current run 222 is complete. For example, looking back over a predetermined number of generations, the search may have failed to produce improvement in the solutions during each generation/iteration 221 of the current run 222. Improvement may be based upon the quantity of the solutions (e.g., the number of solutions) and the quality of the solutions (e.g., some quantification of distance from a utopia point, box fitness, etc.). In this case, the current run 222 is completed, and processing proceeds to initiate a subsequent run 222. The subsequent run 222 may generate an initial population by invigorating the elite solutions stored in the archive checkpoint 202. In particular, the subsequent run 222 may utilize a first number of the elite solutions from the archive checkpoint 202 as part of the initial population utilized in block 204, but may also invigorate the initial population by adding a second number of randomly generated parent chromosome data structures. The randomly generated parent chromosome data structures may be generated and evaluated using the example processes discussed with respect to blocks 204 and 214.

B. Vector Scaling

Figure 3:
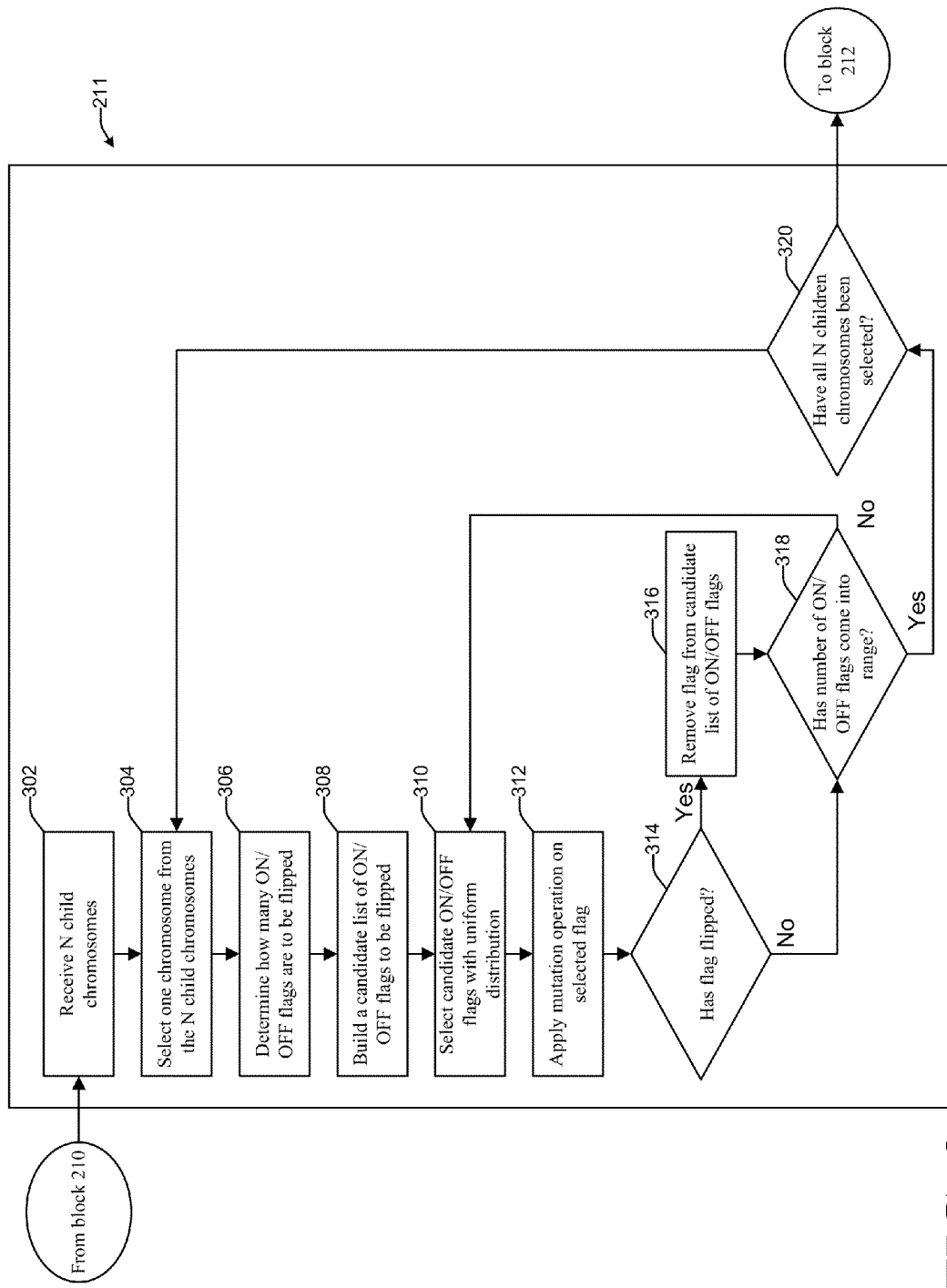
FIG. 3 illustrates an example flow diagram for an asynchronous evolution and automated chromosome bundling process, in accordance with embodiments of the disclosure.

FIG. 3 illustrates an example implementation of a vector scaling operation that may be utilized for block 211 of FIG. 2. It will be appreciated that the vector scaling process of FIG. 3 is provided by way of example only, and that many variations are available without departing from example embodiments of the disclosure. The vector scaling operation 211 may be performed by the master processor 106 or other suitable entities of the core management system 100.

At block 302, a number, N, of child chromosomes may be received from the evolutionary operations of selection 206, crossover 208, and/or mutation 210. Therefore, at this point, the received population of child chromosomes may include any suitable number of chromosomes resulting from the evolutionary operations 206, 208, 210 'ON' parent chromosomes. While the parent chromosomes may be in compliance with a specified maximum number of genes that may be evaluated in any particular generation, the newly formed children may not be in compliance with the specified maximum number of genes that may be evaluated in any particular generation. In other words, although parent chromosomes that produce child(ren) chromosomes may have a maximum number of flags set below a specified number, the resulting child(ren) may have more than the maximum number of flags set, after being subject to the evolutionary operations 206, 208, 210. At the conclusion of the vector scaling operation all of the chromosomes of the set of N child chromosomes, as received at block 302, may have a maximum of the specified number of flags set indicating the corresponding respective genes that may be evaluated at blocks 214 and 215 by the master processor 106 and slave processors 108. Of the N child chromosomes received, some or all of chromosomes may already have fewer than the maximum specified level of flags set and, therefore, may not be modified. Similarly, some or all of the received N chromosomes may have greater than the maximum specified level of flags set and, therefore, may be modified so that the total number of flags set in any given child chromosome, as received at block 302, is less than or equal to the specified level.

At block 304, one of the chromosomes of the set of N child chromosomes may be selected. The selection may be 'ON' the basis of an index and/or an identifier, such as in an ascending progression of indexes/identifiers. Alternatively, the selection may be random or in accordance with other suitable probability distribution functions. At block 306, it may be determined how many of the flags need to be flipped to comply with the specified maximum number of flags indicating the maximum number of genes that may be evaluated in a particular generation/iteration. As a non-limiting example, if the specified maximum number of flags specified, such as by an operator of the evolutionary algorithm, to be 50 and the selected chromosome has 54 flags turned ON, then at block 304, it may be determined that 4 of the 54 'ON' flags need to be flipped.

At block 308, a candidate list of flags that may be flipped may be identified. In certain embodiments, the candidate list may not include any flags, such as in the case where there are no flags that need to be flipped, as determined at block 306. In other cases, the candidate list may include all of the flags that are turned 'ON' in the selected chromosome. In yet other cases, the a subset of the flags that are turned 'ON' in the selected chromosome may be included 'ON' the candidate list of flags that may be flipped. Indeed, it will be appreciated that the candidate list of flags may include at least as many flags that need to be flipped, as identified at block 306.

At block 310, a particular flag may be selected from the candidate list of flags that may be flipped. As indicated, the selection of the particular flag form the candidate flags 'ON' the candidate list may be performed with a uniform distribution. However, it will be appreciated that any suitable probability distribution function may be employed to select the particular flag from the list of candidate flags that may be flipped. For example, in some cases, a binomial distribution function may be used to select the particular flag from the list of candidate flags that may be flipped.

At block 312, a mutation operation may be applied to the selected flag. The mutation operation may provide a non-zero probability of the selected flag flipping, such as form an 'ON' or '1' state to an OFF or '0' state. The non-zero probability, in certain embodiments, may be a predetermined probability level. In other embodiments, the non-zero probability may be dynamic and, therefore, may change over time, flag, and/or chromosome. It will be appreciated that in the probability of mutation associated in block 312 may be the same or different form the probability of mutation at block 210 of FIG. 2. As a non-limiting example, the probability of mutation of the selected flag, at block 312, may be in the range of about 1% to 3%.

At block 314, it may be determined if the selected flag had been flipped at block 312. If the selected flag had not been flipped, then the vector scale reduction method 211 may proceed to block 318, where it may be determined that the number of flags are still not below the maximum specified and the method 211 may return to block 310. At block 310, the method 211 may select another particular flag form the list of candidate flags and may repeat the processes of blocks 312, 314, 316, and/or 318 in an iterative loop until the selected chromosome has no more than the specified maximum number of flags turned ON.

If at block 314 it was determined that the flag had flipped, then at block 316, the flipped flag may be removed from the candidate list of flags that may be flipped to bring the chromosome, as selected at block 304, in compliance with the maximum specified number of genes that may be evaluated in any given generation and/or iteration.

After removing the flipped flag from the candidate list of flags that may be flipped for the currently selected chromosome, at block 318, it may be determined if the number of flags have come within the specified range of genes that may be evaluated in any given generation and/or iteration. If it is determined, at block 318, that the number of flags have not come within the specified range, then the method 211 may return to block 310, where a next flag may be selected from the list of candidate flags and subjected to a mutation operator, at blocks 310 and 312, respectively. Indeed, flags may be selected and subjected to the mutation operator in an iterative loop of processes 310, 312, 314, 316, 318, for the selected chromosome until the selected chromosome is in compliance with the maximum number of flags that may be set for a particular generation and/or evaluation iteration.

At block 318, if it is found that the flags for the currently selected chromosome has come into the stipulated range, then at block 320, it may be determined if all N child chromosomes had been selected. If all of the N child chromosomes, as received at block 302, have been selected at block 304, and therefore are in compliance with the maximum number of 'ON' flags, then the method 211 may end and the N child chromosomes, some of which may be modified during the scale reduction process 211, may be returned to block 212 of FIG. 2.

As a non-limiting illustrative example of the scale reduction process 211, consider that 10 child chromosomes may be received at block 302 and that each of the 10 chromosomes have 1500 first set of genes and 1500 respective corresponding flags, or second set of genes. In other words, the each of the chromosome may be structured as $[X_0, F_0, X_1, F_1, \ldots, X_{1499}, F_{1499}]$, where $X_i$, i=0 . . . 1499 may be the genes of the first set of genes and $F_i$, i=0 . . . 1499 may be the corresponding respective flags of second set of genes. It should be noted that while the chromosome is shown to have the flags interlaced with the first set of genes, in other embodiments, the flag genes may be may not be immediately adjacent to the corresponding respective one of the first set of genes. For example, in certain embodiments, the chromosomes may be organized as $[X_0, X_1, \ldots, X_{1499}, F_0, F_1, \ldots, F_{1499}]$. Continuing 'ON' with the illustrative example, it may further be stipulated, such as via user input, that the maximum number of first set of gene changes to be considered in any given generation may be 50. It may be found that of the 10 received chromosomes, 6 have 50 or fewer 'ON' flags. In this case, those 6 chromosomes may remain unchanged after the scale reduction process 211. The remaining 4 chromosomes may have greater than 50 flags in an 'ON' state. In this case, those 4 chromosomes may be iteratively modified in the outer, chromosome level, loop of the scale reduction process 211 and the inner, gene level, loop of the scale reduction process 211. Ultimately, the scale reduction process may modify some of the flags of the 4 chromosomes that originally had greater than 50 'ON' flags and return all 10 chromosomes to block 212 of FIG. 2, each with 50 or fewer chromosomes, wherein 4 of the chromosomes are modified during the scale reduction process 211.

It will be noted that in this example, of the possible original 1500 genes, only 50 genes or fewer, as indicated by the corresponding respective flags, may be considered different from a baseline chromosome for the purposes of objective function evaluation of the evaluation and timing operations 215 of the slave processors 108. This is, indeed, considering a situation where approximately 3.33% of the genes or less of the total number of genes may be considered to have changed from a known, such as a best-known or a pretty-good known, baseline solution for the purposes of evaluating the objective functions by the slave processors 108. By considering a change in only a subset, and in some cases a single digit percentage subset, of the complete set of genes, less computational resources may be used to provide an optimized solution, a solution may be arrived at in relatively less time than if all the genes were considered in the objective functions, and the highest impact genes (most sensitive variables) may be isolated from genes of lower impact on the one or more objective functions, as evaluated at block 215 of FIG. 2.

It will further be appreciated that in certain embodiments, the number of flags may be specified with in a range. In other words, the operations of scale reduction method 211 may be performed to bring each child chromosome to have 'ON' flags within a range specified by a lower-bound and an upper-bound. Therefore, the method 211 may be performed, in accordance with embodiments of the disclosure, such that if too few flags are found to be turned 'ON' in any of the incoming child chromosomes, then the processes of 306, 308, 310, 312, 314, 316, and 318, may operate to flip 'OFF' flags to an 'ON' state for one or more of the received N child chromosomes.

The operation of the scale reduction operation to provide the aforementioned range of 'ON' flags may be appreciated by way of a non-limiting example. Consider, for example, that 10 child chromosomes are received at block 302 after the evolutionary operators of selection 206, crossover 208, and mutation 210. Consider further that an upper-bound of flags are set, such as by user input at 50 flags, and a lower-bound of flags is set, such as by user input, at 30 flags. Consider, yet further, that 5 of the chromosomes were received at block 302 with 'ON' flags within the range of 30 to 50, 3 chromosomes were received with more than 50 'ON' flags, and the remaining 2 chromosomes were received with fewer than 30 'ON' flags. In this case, the 5 chromosomes with flags in the range of 30 and 50 may remain unchanged during the scale reduction process 211. The 3 chromosomes with greater than 50 flags may be modified in the manner described in the previous example such that no more than 50 flags are turned 'ON' in those 3 chromosomes after the scale reduction process 211. For the 2 chromosomes with fewer than 30 'ON' flags, one of the two chromosomes may be selected at block 304, and at block 306, it may be determined that some of the 'OFF' flags for the selected chromosome need to be flipped to bring the total number of 'ON' flags to at least 30. At block 308, a candidate list of 'OFF' flags may be identified. For example, the candidate list may include all or some of the 'OFF' flags of the selected chromosome. Next an iterative process involving selecting one candidate flag and applying a mutation operator, at block 312, may be performed until at least 30 flags are turned 'ON' in the selected chromosome. After the first selected chromosome of the two chromosomes is brought within the specified range of 'ON' flags, the same may be performed 'ON' the second of the 2 chromosomes.

C. Asynchronous Evolution and Automated Chromosome Bundling

Figure 4A:
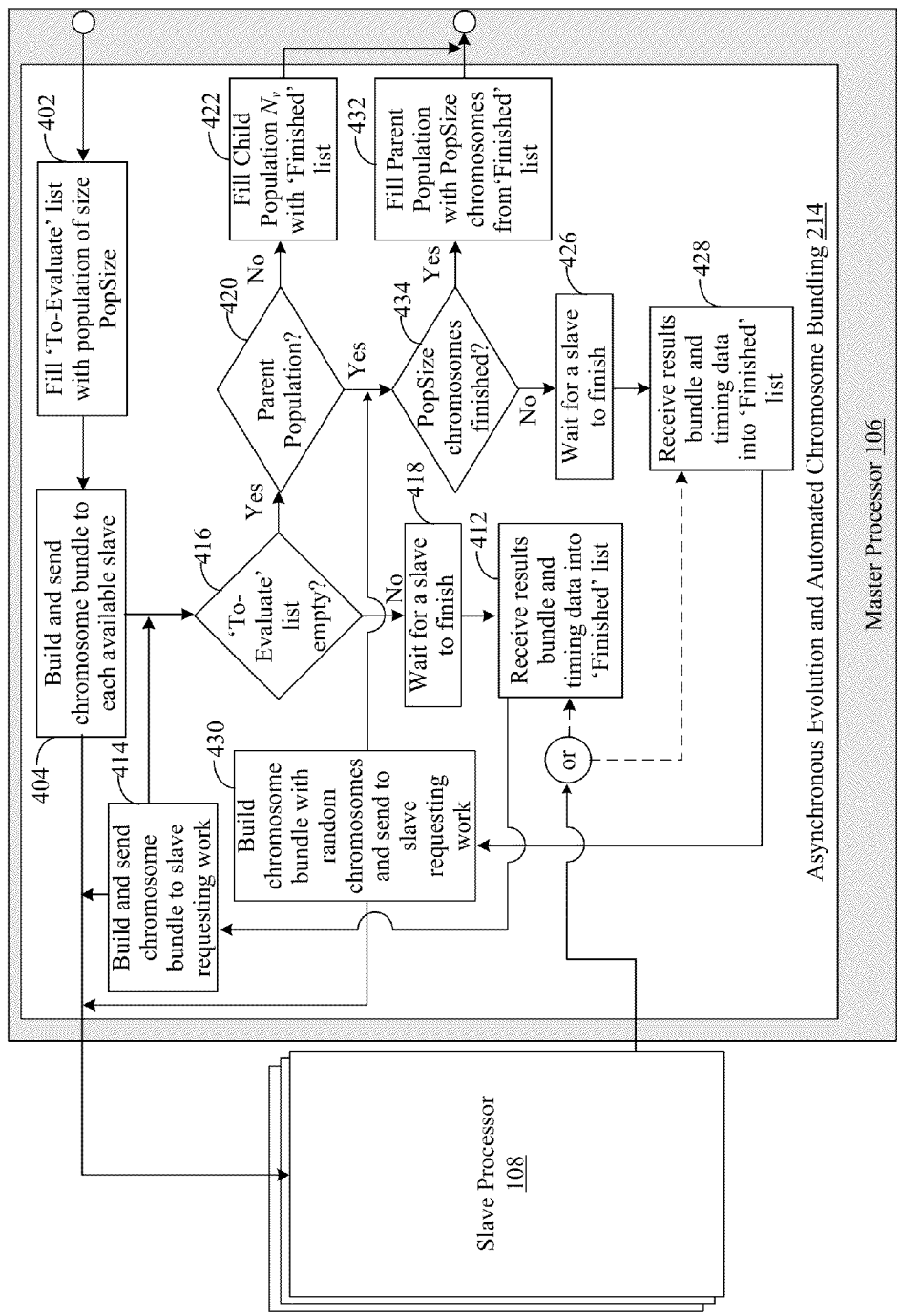
FIGS. 4A-4B illustrate example flow diagrams for slave processor and timing operations, in accordance with embodiments of the disclosure.

FIG. 4A illustrates an example implementation of an asynchronous evolution and automated chromosome bundling process that may be utilized for block 214 of FIG. 2. It will be appreciated that the example asynchronous evolution and automated chromosome bundling process of FIG. 4A is provided by way of example only, and that many variations are available without departing from example embodiments of the disclosure.

The asynchronous evolution and automated chromosome bundling process can be utilized in conjunction with at least two example scenarios: (i) evaluation of a randomly generated initial population (e.g., block 204 of FIG. 2) or (ii) evaluation of a new child population (e.g., block 212 of FIG. 2).

Turning now to FIG. 4A, the process begins with block 402 in which a "To Evaluate" list or queue is filled with either (i) the randomly generated input population of parent chromosome data structures from block 204, or (ii) the new child population of chromosome data structures from block 212. It should be noted that the chromosomes provided to block 402 may include a first set of genes corresponding to variable to be optimized and a second set of genes, or flags, where each flag corresponds to a respective one of the genes of the first set of genes and indicates if the respective one of the first set of genes may be modified and/or evaluated in the present iteration/generation. In block 404, the master processor 106 may allocate the chromosome data structures from the "To-Evaluate" list or queue to some or all of the plurality of slave processors 108. More specifically, in block 404, the master processor 106 may build a chromosome bundle for each available slave processor 108 that is to receive work. It will be appreciated that some slave processors 108 may be busy processing chromosome bundles from previous generations/iterations. The number of chromosome data structures included within each chromosome bundle may be determined by the master processor 106 using an example bundling calibration algorithm, which will now be described in further detail.

In an example embodiment of the disclosure, an example chromosome bundling calibration algorithm may utilize the following tuning knobs or tuning parameters, which may be set, predetermined, or adjusted by a user:

Time_to_Process_Chrom_Bundle_Theshold: A threshold time to process the chromosome bundle (e.g., 10 minutes). This threshold time may provide a target for how many chromosome data structures to include in a chromosome bundle such that the processing time during function evaluation reaches at least this threshold time.

Number_of_Chromosome_Bundles_Needed_for_Rolling_Average: Provides the number of chromosome bundles (e.g, 25) (each having a certain number of chromosome data structures) that each slave processor will process to achieve an acceptable rolling average. The rolling average refers to the total time that the average timing data is collected over.

In addition, each slave processor 108 may maintain the following timing data:

Rolling_Average_Wait_Time: An amount of time that a slave processor 108 spends waiting for work from a master processor 106.

Average_Function_Evaluation_Time: A cumulative average time required by a slave processor 108 to process or evaluate a single chromosome data structure.

In an example embodiment of the disclosure, a goal of the example bundling calibration algorithm in block 404 may be to help keep the slave processors 108 at a fairly high (e.g., nearly 100%) utilization rate. Increasing the bundle size decreases the number of packets sent across the network and helps to minimize the time the slave processors 108 are waiting for work. However, if the bundle size is too large, a lag or delay may result in which a chromosome data structure may be potentially outdated by the evolutionary progress. The equilibrium bundle size may be dependent on the function evaluation times of the slave processors 108 and the network capability.

The bundling calibration algorithm may be performed by the master processor 106 for each slave processor 108. In an example embodiment of the disclosure, the bundling calibration algorithm may be performed for each slave processor 108 based upon the occurrence of one or more of the following conditions: (i) a sufficient number of chromosome data structures have already been processed and calibration has yet to occur, (ii) the rolling average wait time for a slave processor has changed by a threshold amount (e.g., >10%), and/or (iii) the number of slave processors 108 being managed by the master processor 106 has changed.

In an example embodiment of the disclosure, the bundling calibration algorithm may be implemented as follows in Table I. It will be appreciated that variations of the algorithm in Table I are available without departing from example embodiments of the disclosure.

TABLE I

Bundling Calibration Algorithm

When (Average_Function_Evaluation_Time >
    Time_to_Process_Chrom_Bundle_Theshold),
    set Bundle_Size = 1.
If (Bundle_Size * Average_Function_Evaluation_Time) >
    Time_to_Process_Chrom_Bundle_Theshold), then reduce
    Bundle_Size by 1, and monitor the benefit of the reduced
    Bundle_Size (If Rolling_Average_Wait_Time has not increased,
    then keep new Bundle_Size; Otherwise, keep the prior
    Bundle_Size);
Else (Bundle_Size is less than threshold), then set Bundle_Size =
    (Time_to_Process_Chrom_Bundle_Theshold/
    Average_Function_Evaluation_Time); monitor the benefit (wait
    until the number of chromosome data structures needed to
calculate the Rolling_Average_Wait_Time has been processed); and
    register or store the new Bundle_Size and new
    Rolling_Average_Wait_Time.

The chromosome bundles generated in block 404 may be allocated to the slave processors 108. Each slave processor 108 may evaluate, in accordance with a plurality of objective functions, the received chromosome bundle of chromosome data structures to generate a plurality of respective objective function values for each chromosome data structure. In addition, each slave processor 108 may also perform timing operations or calculations, including a determination of the Rolling_Average_Wait_Time_and_Average_Function_Evaluation_Time associated with the respective slave processor 108. As each slave processor 108 finishes the objective function evaluations and/or timing operations in block 215, the slave processor 108 may provide a results bundle (e.g., objective function values) and timing data to the master processor 106. The results bundle and timing data may be received in the "Finished" list or queue in block 412 or block 428, depending on the states of blocks 416, 420, and 424.

In particular, if the "To-Evaluate" list or queue is not empty (block 416), then the master processor 106 may wait for one or more slave processor 108 to finish, and the results bundle and timing data may be received into the "Finished" list or queue in block 412. Processing may then proceed from block 412 to block 414, where additional chromosome data structures from the "To-Evaluate" list or queue may be allocated in one or more chromosome bundles to one or more slave processors 108 that have previously finished processing and are waiting for additional work.

Once the "To-Evaluate" list or queue is empty, processing may proceed to block 420 to determine whether a parent population is being evaluated. If not, then the "Finished List" may be filled with the evaluated child population of chromosome data structures in block 422. On the other hand, if the parent population is being evaluated, then processing may proceed to block 424 to determine whether a predetermined population size (PopSize) has been evaluated. If so, then processing proceeds to block 432, where the "Finished List" may be filled with the evaluated parent population of chromosome data structures. On the other hand, block 424 may determine that less than the predetermined population size has been evaluated, and processing may proceed to block 426 to wait for one or more slave processors 108 to finish. Following block 426, processing may proceed to block 428 where the results bundle and timing data may be received from the just finishing slave processors 108 into the "Finished" list or queue. Processing may then proceed to block 430, where additional chromosome data structures are randomly generated and allocated in one or more chromosome bundles to one or more slave processors 108 for objective function evaluation.

In an example embodiment of the disclosure, block 430 may be utilized to keep available slave processors 108 working with randomly generated chromosome data structures until the predetermined parent population size has been reached. The modified parent population must have the prerequisite number of chromosome data structures, and some of the randomly generated chromosomes may complete processing prior to the chromosome data structures originating from the parent population; in this situation they will become part of the modified parent population, which is received back to block 414. The remaining randomly generated chromosomes will eventually complete and become part of a subsequent modified child population. Block 430 may improve efficiency by keeping slave processors 108 more fully employed, according to an example embodiment of the disclosure.

It will be appreciated that many variations of the FIG. 4A are available without departing from example embodiments of the disclosure.

D. Slave Processor Evaluation and Timing Operations

Figure 4B:
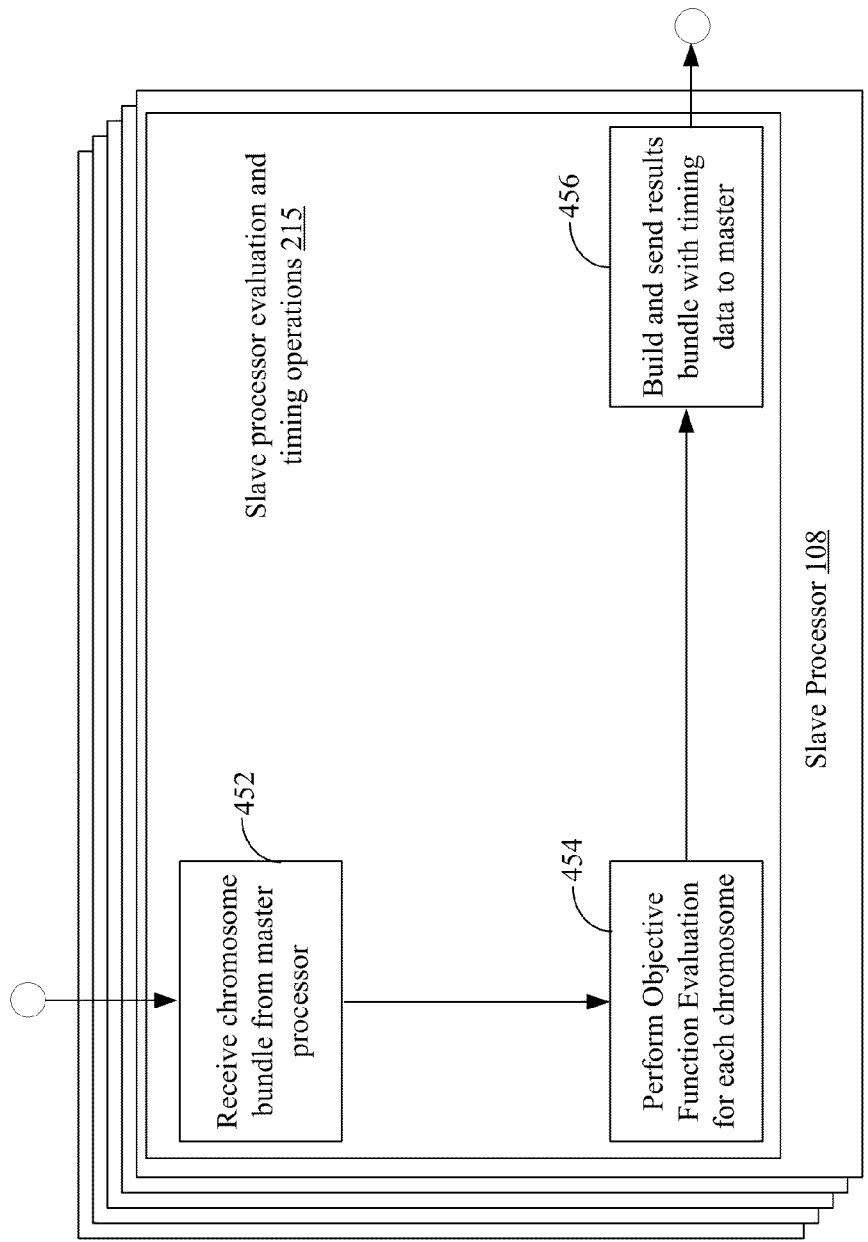

FIG. 4B illustrates example slave processor and timing operations that may be utilized for block 215 of FIG. 2, according to an example embodiment of the disclosure. It will be appreciated that the example slave processor and timing operations of FIG. 4B are provided by way of example only, and that many variations are available without departing from example embodiments of the disclosure.

Referring now to FIG. 4B, in block 452, a slave processor 108 may receive a chromosome bundle having one or more chromosome data structures from the master processor 106. In accordance with embodiments of the disclosure, the constituent chromosomes of the received bundles may include a first set of genes and a second set of genes. The first set of genes may be associated with a decision space variable that may be optimized based 'ON' one or more objective functions. The second set of genes may include flags that may correspond to respective genes of the first set of genes. The flags may indicate which of the corresponding respective genes may be considered changed from an existing baseline chromosome. In other words, only the genes of the first set of genes that correspond to 'ON' flags of the second set of genes may be considered to have changed form a baseline for the purposes of evaluating the objective functions by the slave processors 106 during the evaluation and timing operations.

At block 454, the slave processor 108 may perform objective function evaluation for each chromosome data structure in the chromosome bundle. As discussed above, the objective function evaluation may be in accordance with a specified maximum, or range, of genes that are allowed to differ from a baseline chromosome. The evaluation of the objective function evaluation may be based, at least in part, on a perturbation of only those genes from a baseline chromosome, for which the corresponding respective flag is turned 'ON,' or otherwise indicative of a gene that should be considered during the objective function evaluation. In certain embodiments, the baseline chromosome may represent a known solution to the optimization problem, such as a best known solution and/or a pretty good solution.

It will be appreciated that in certain embodiments, the baseline chromosome may be fixed from one evaluation generation to the next. In other embodiments, the baseline chromosome itself may evolve over time. In a non-limiting example, a new baseline chromosome may be provided to the slave processors 108 every time new bundles of chromosomes are sent to the slave processors 108 for objective function and timing operations 215. In other non-limiting examples, a new baseline chromosome, representing a known solution may be provided to the slave processors for the purposes of objective function evaluations on a periodic basis. In certain embodiments, when a new baseline chromosome is provided to the slave processors 108 from the master processor 106, the new baseline chromosome may be the most optimized solution found up till that point in time, such as up till that iteration and/or generation of solutions.

In an example embodiment of the disclosure, the slave processor 108 may perform objective function evaluation by applying a plurality of objective functions to each chromosome data structure. The slave processor 108 may access the objective functions from a local memory or database, or may otherwise access the objective functions from a network memory or database. In block 456, the slave processor 108 may also calculate or maintain timing data, such as wait times and/or objective function evaluation times described herein. The slave processor 108 may build and send the results bundle with the timing data to the master processor 106.

III. Box Fitness Termination Criteria

The termination criteria described in block 219 of FIG. 2 will now be described in further detail. In an example embodiment of the disclosure, the termination criteria may be based upon box fitness, as described herein.

As described above, the master processor 106 may have allocated a population of chromosome data structures to the slave processors 108 in respective chromosome bundles for evaluation. The slave processors 108 may evaluate the chromosome data structures according to at least two objective functions $f_1$ and $f_2$, the flags of the chromosomes to be evaluated, and a baseline chromosome that is a known solution. Accordingly, each chromosome data structure may be associated with at least a respective first objective function value and a second objective function value corresponding to the objective functions $f_1$ and $f_2$.

Initially, a first non-domination sorting may be applied to the current population to remove solutions that are dominated by at least one other solution (see, e.g., FIG. 5A, discussed below). It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population (see, e.g., FIG. 5B, discussed below). Epsilon non-domination sorting may include plotting or mapping the remaining solutions to a first epsilon value for objective function $f_1$ and a second epsilon value for objective function $f_2$, according to an example embodiment of the disclosure. The first epsilon value may be associated with a first epsilon spacing or step size $\epsilon_1$ associated with objective function $f^1$, and a second epsilon value may be associated with second epsilon spacing or step size $\epsilon_2$ associated with objective function $f_2$. Each solution may then be associated with an epsilon vector or epsilon box address $(\epsilon_1, \epsilon_2)$ corresponding to the first epsilon value and the second epsilon value. If two or more solutions have the same epsilon box address, then the epsilon non-domination sorting may retain a single solution per epsilon box address $(\epsilon_1, \epsilon_2)$. This solution may be determined based upon whether objective functions $f_1$ and $f_2$ are being minimized or maximized, according to an example embodiment of the disclosure. It will be appreciated that while only two objective functions are described herein, other example embodiments may utilize more than two objective functions without departing from example embodiments of the disclosure.

In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

An example box fitness termination criteria will be described more particularly with respect to FIGS. 5A-5F. FIG. 5A illustrates a feasible design region 502 associated with a first objective function $f_1$ and a second objective function $f_2$. Within the feasible design region is a snapshot of a population of solutions (e.g., at block 216 or 616) of a given generation/iteration, according to an example embodiment of the disclosure. Based upon the goal of minimizing the first and second objective functions $f_1$ and $f_2$, non-domination sorting (e.g., at block 218 or 618) identifies all of the circles as being non-dominated solutions and all of the triangles as dominated solutions. The dominated solutions may be eliminated from the population or removed from further consideration, according to an example embodiment of the disclosure.

Figure 5A:
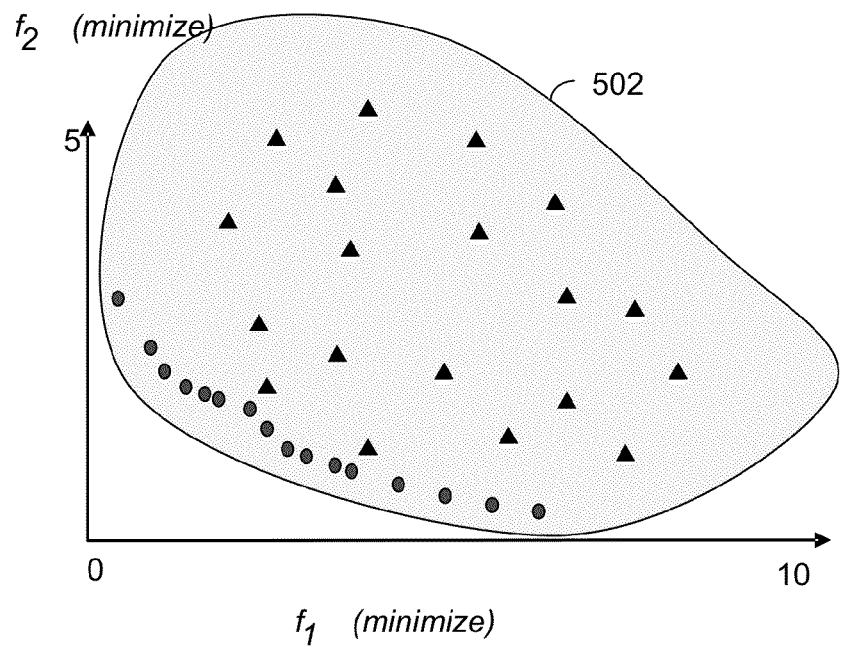
FIGS. 5A-5F illustrate a visual representation of an operation of box fitness termination criteria, in accordance with embodiments of the disclosure.
Figure 5B:
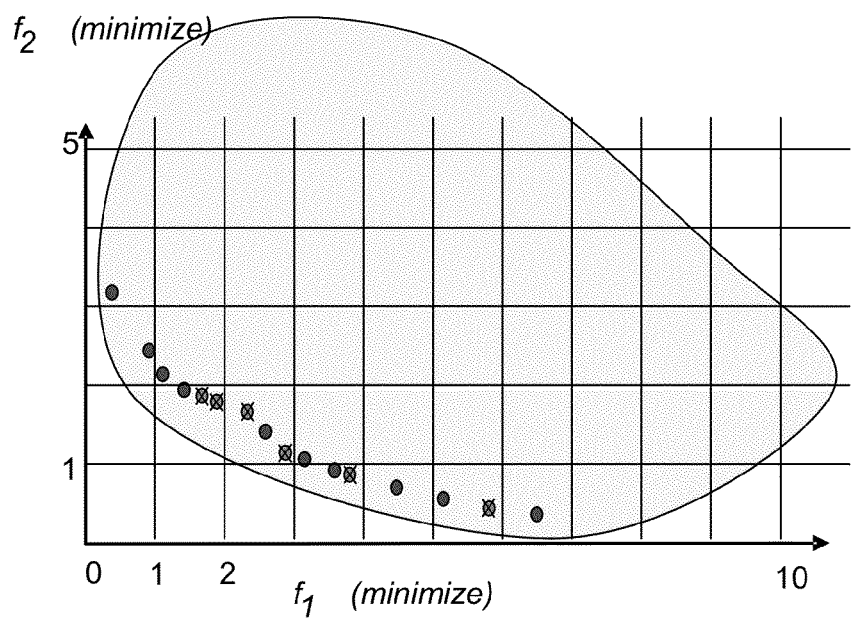

In FIG. 5B, epsilon non-domination sorting may be applied to the remaining solutions (e.g., non-eliminated solutions) from the first non-domination sorting of FIG. 5A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 5B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the disclosure.

Figure 5C:
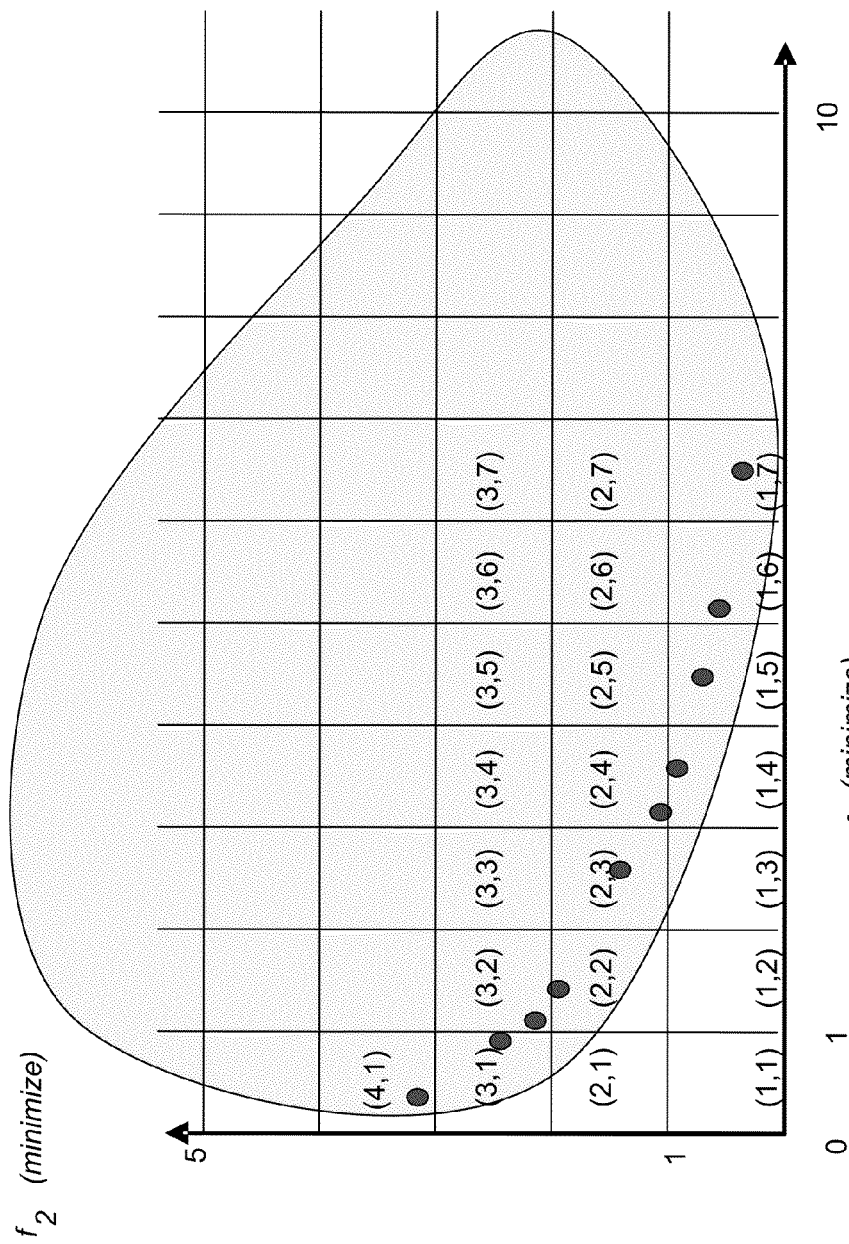

In FIG. 5C, the epsilon non-dominated solutions are illustrated. Each of these solutions has an epsilon box address as shown by FIG. 5C. Each solution inside a given box has a fitness based upon its domination rank and diversity, as described herein in accordance with an example embodiment of the disclosure. Since only one solution can exist in any given box during a generation/iteration (e.g., box 221 or 621), one can count how many boxes remain unchanged from iteration to iteration.

Figure 5D:
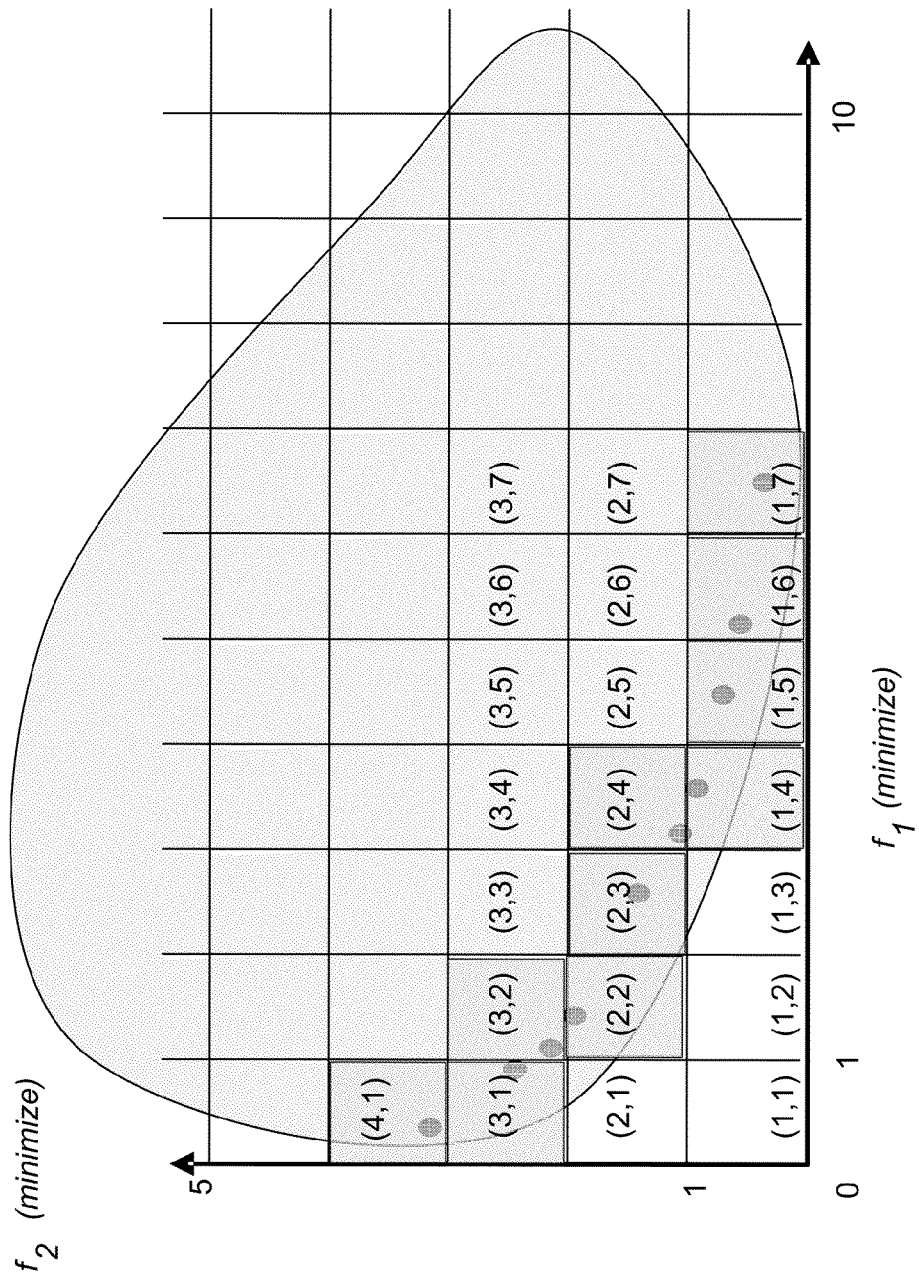

In FIG. 5D, the number of unique boxes for a particular generation/iteration (e.g., box 221 or 621) is illustrated. In particular, in FIG. 5D, there are 10 unique boxes corresponding to the addresses of: (4,1), (3,1), (3,2), (2,2), (2,3), (2,4), (1,4), (1,5), (1,6), and (1,7). The addresses for each unique box may be stored in a memory or archive for the purposes of comparison to future generations.

Recall that the box fitness termination criteria may operate as follows: (1) Looking back over a predetermined number of previous generations/iterations (e.g., block 221 or 621), the total quantity of unique box addresses must remain unchanged above a threshold (e.g., 90%), (2) This greater-than-or-equal-to threshold must be maintained for a pre-defined number of generations/iterations (e.g., 20 generations/iterations), and (3) If both of these conditions are met, then the job is terminated.

Figure 5E:
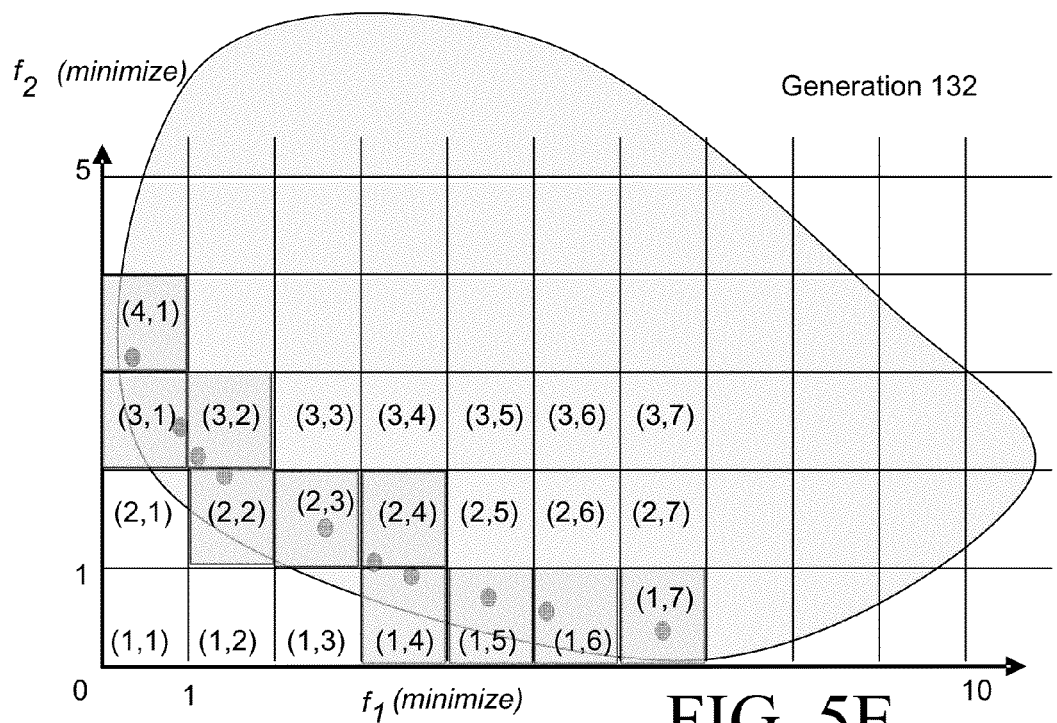
Figure 5F:
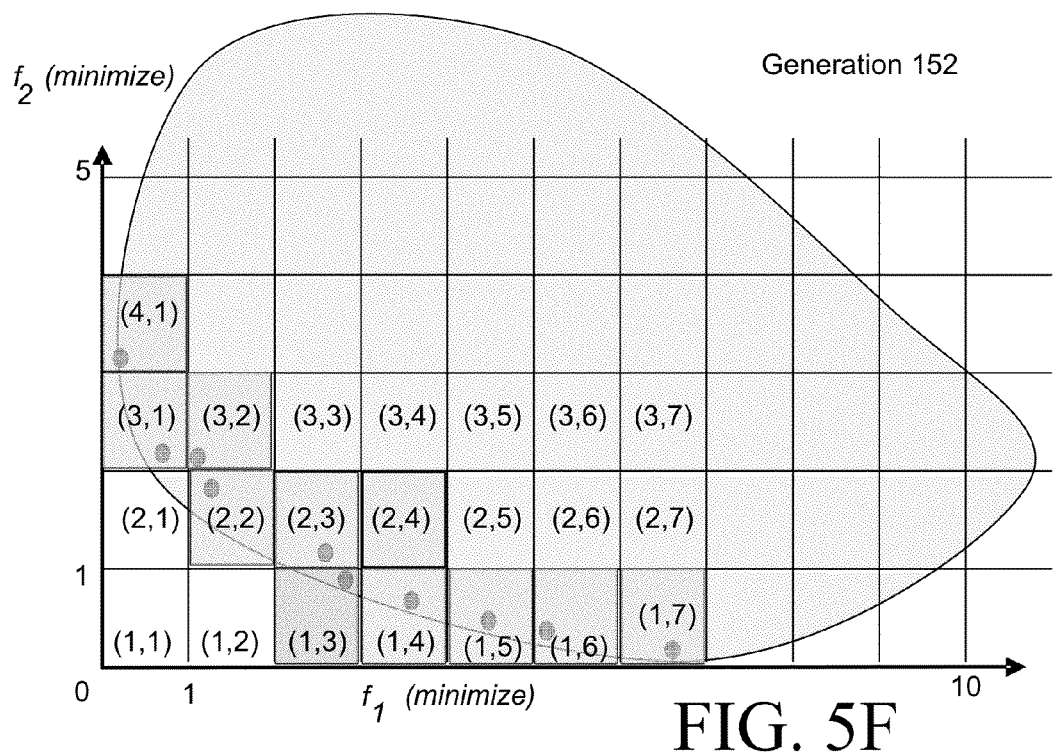

FIG. 5E illustrates a snapshot of a mostly converged population of epsilon non-dominated solutions at a particular generation/iteration such as generation #132. FIG. 5F illustrates a snapshot of the population of non-dominated solutions at a subsequent generation/iteration such as generation #152. As compared to FIG. 5E, one of the solutions in FIG. 5F has moved closer to the Pareto-optimal front, but the remaining solutions have not materially improved with regard to their box addresses. Note one new epsilon box address of (1,3) has been found in FIG. 5F as compared to FIG. 5E. However, this represents a 90% unchanged population between FIGS. 5E and 5F with respect to unique box addresses, which has remained above this threshold for the predetermined number of consecutive generations/iterations (e.g., last 20 consecutive generations/iterations), so this job can be terminated.

It will be appreciated that while the box fitness criteria has been illustrated with respect to two objective functions, the box fitness can be applied where there are three or more objective functions without departing from example embodiment of the disclosure. Indeed, the box-fitness termination criteria can be generalized to n-objectives/dimensions, where 3 objectives/dimensions may be represented by volumes, and 4+ objectives/dimensions can be represented by hypervolumes.

In addition, it will be appreciated that the epsilon spacings or step sizes discussed herein may be varied in accordance with an example embodiment of the disclosure. For example, a larger epsilon spacing or step size may decrease the number of generations/iterations that are needed before the box-fitness termination criteria is met and a job is terminated. On the other hand, a smaller epsilon spacing or step size may increase the number of generations/iterations that are needed before the box-fitness termination criteria is met and the job is terminated.

It will also be appreciated that the epsilon spacing or step size of the epsilon vector can also be dynamically adjusted or changed. An example method for dynamically changing the epsilon vector will now be discussed in further detail. Suppose, for example, that there is a 10-dimensional optimization problem in which there are 10 objectives:

For each objective, the decision maker (problem stakeholder) may decide, a priori, how many epsilon non-dominated solutions are desired for each objective. For example, perhaps 10 solutions for the first objective/dimension, 20 for the second objective/dimension, etc.

For each objective, at some predetermined interval, which may or may not be as frequently as the end of a given generation/iteration:

Calculate the maximum and minimum objective values and scale between 0 and 1. If the user wanted 10 solutions, for example, then we would desire one solution to fall with the slice between 0 and 0.1, one between 0.1 and 0.2, etc.

For each of these slices, calculate the number of epsilon non-dominated solutions.

Then calculate the average number across all slices. If this average is greater than 1, then increase the epsilon value (e.g., epsilon spacing or step size) for that objective dimension according to 3) below. On the other hand, if this average is less than 1, then decrease the epsilon value (e.g., epsilon spacing or step size) for that dimension according to 3) below.

Adjust the epsilon value (e.g., epsilon spacing or step size) for the next iteration by multiplying the average number of epsilon non-dominated solutions per slice for that objective by the current epsilon value. If the average rate is greater than 1, then the new epsilon value will encourage the set to shrink in that dimension. If, the average is less than 1, then the new epsilon value will encourage the set to grow in that dimension objective.

Over time, using the process described in steps 2-3 will result in an epsilon vector that oscillates in all dimensions around a "mean" vector or steady-state value. For computational efficiency, all epsilon non-dominated solutions found during a given job will be stored off-line and potentially added back into the population after a new epsilon vector is determined. This mechanism ensures that previously epsilon non-dominated solutions are not lost as the dynamic epsilon vector elements are reduced or increased in size at the predetermined frequency.

Example Embodiment for Airline Network Schedule Optimization

Airline network schedule optimization may be used to determine an optimal set of flight schedules for one or more airlines or airports. Generally, with prior methods, the amount of processing time required to solve the schedule optimization problem increases very quickly as the size of the problem grows. However, the evolutionary software program described herein leveraging vector scaling techniques may enable an optimization solution for the scheduling problem in less than the super-polynomial time typically required using prior methods. Indeed, such techniques may provide for solutions to the airline schedule problem even for large airline networks with 2000+ daily departures.

According to an example embodiment of the disclosure, the evolutionary software program is used to optimize the daily schedule for an airline wherein the decision makers (stakeholders) seek to maximize revenue, minimize cost, and minimize the number of schedule disruption. The objectives of revenue and cost may be double precision objective function values, while the number of schedule disruptions may be an integer value. The chromosome (decision variable space) may include the take-off time for 2000 flight legs to potentially as many airports. A baseline solution (where none of the 2000 variable representing the take-off times of the 2000 flight legs deviate from the baseline schedule) may be represented with all zeroes, indicating no deviation form the baseline. In addition 2000 flag genes may be added to the baseline solution chromosome to enable the vector scalability methods described above. Therefore, there may be 4000 total genes in the chromosome data structures of this optimization problem. The first set of genes associated with the departure times, or deviations thereof form a baseline time, may be integer values. The integer values may be the number of minutes of deviation from the baseline departure times. Alternatively, the first set of genes may be integer coded value representing predetermine values of deviations from the baseline departure times. For example, a value of 1 may represent a 30 minute deviation from the baseline departure time, while a −1 may represent a −30 minute deviation from the baseline departure time. The second set of genes (flags), indicative of which of the first set of genes may be considered to deviate from the baseline in a particular cycle and/or iteration of objective functions, may be Boolean variables.

While the example above describes a particular implementation, it will be appreciated that the systems and methods, as described herein, may be applied to a variety of business, technical, and/or scientific optimization problems.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   defining, by one or more processors, a chromosome data structure that includes a plurality of first variables that are permitted to evolve in value and corresponding respective second variables, wherein the second variables are Boolean flags that indicate if the corresponding respective first variable is to be evaluated in a current generation;
   identifying, by the one or more processors, one or more objective functions for evaluating chromosome data structures;
   receiving, by the one or more processors, a baseline chromosome data structure, wherein the baseline chromosome data structure represents a known solution;
   identifying, by the one or more processors, a range flag, wherein the range flag indicates at least a maximum number of genes of a chromosome data structure that are permitted to be different from the baseline chromosome data structure when evaluating the one or more objective functions;
   generating, by the one or more processors, one or more chromosome data structures based at least in part on the range flag, wherein each of the one or more chromosome data structures comprise a first set of genes and a second set of genes, wherein each of the genes of the second set of genes corresponds to a respective gene of the first set of genes and indicates whether the corresponding gene of the first set of genes is permitted to be different from the baseline chromosome data structure in evaluating the one or more objective functions; and determining, by the one or more processors, one or more objective values corresponding to the one or more chromosome data structures based at least in part on the baseline chromosome and the one or more objective functions.

2. The method of claim 1, wherein receiving the baseline chromosome data structure comprises at least one of: (i) receiving, by the one or more processors, the baseline chromosome from user input; (ii) generating, by the one or more processors, the baseline chromosome data structure.

3. The method of claim 1, wherein identifying the range flag comprises receiving, by the one or more processors, the range flag from user input.

4. The method of claim 1, wherein the range flag further specifies a minimum number of genes of a chromosome data structure that are permitted to be different from the baseline chromosome data structure in evaluating the one or more objective functions.

5. The method of claim 1, wherein generating the one or more chromosome data structures further comprises generating a first set of one or more chromosomes by performing, by the one or more processors, at least one of a: (i) a selection operation on at least one parent chromosome data structure; (ii) a crossover operation on at least one parent chromosome data structure; or (iii) a mutation operation on at least one parent chromosome data structure.

6. The method of claim 5, wherein generating the one or more chromosome data structures further comprises:

identifying, by the one or more processors, the chromosomes of the first set of one or more chromosomes that have a number of third set of genes set to 'ON' greater than the range flag; and modifying, by the one or more processors, the identified chromosomes of the first set of one or more chromosomes such that the number of third set of genes set to 'ON' for each of the identified chromosomes of the first set of chromosomes is no more than the range flag.

7. The method of claim 6, wherein modifying the identified chromosomes of the first set of one or more chromosomes comprises:

selecting, by the one or more processors, one of the first set of one or more chromosomes;

identifying, by the one or more processors, at least one of the genes of the third set of genes of the selected one of the first set of one or more chromosomes is to be flipped; and applying, by the one or more processors, a second mutation operation to the identified at least one of the genes of the third set of genes.

8. The method of claim 1, wherein determining one or more objective values comprises:

selecting, by the one or more processors, one of the one or more chromosome data structures;

identifying, by the one or more processors, each of the second set of genes of the selected one of the one or more chromosome data structures that are turned 'ON';

determining, by the one or more processors, one or more differences between one or more genes of the first set of genes of the baseline chromosome data structure corresponding to the identified each of the second set of genes of the selected one of the one or more chromosome data structures that are turned 'ON' and one or more genes of the first set of genes of the selected one of the one or more chromosomes corresponding to the identified each of the second set of genes of the selected one of the one or more chromosome data structures that are turned 'ON'; and calculating, by the one or more processors and based at least in part on the one or more differences, at least one objective value corresponding to the selected one of the one or more chromosome data structures.

9. The method of claim 1, further comprising performing, by the one or more processors, non-dominated sorting of the one or more chromosome data structures based at least in part on the one or more objective values.

10. The method of claim 9, further comprising identifying, by the one or more processors, an new baseline solution from the one or more chromosomes data structures based at least in part on the non-dominated sorting.

11. A system, comprising:

a memory that stores computer-executable instructions;

at least one processor configured to access the memory, wherein the at least one processor is further configured to execute the computer-executable instructions to:

identify one or more objective functions for evaluating chromosome data structures;

receive a baseline chromosome data structure, wherein the baseline chromosome data structure represents a known solution;

identify a range flag, wherein the range flag indicates at least a maximum number of genes of a chromosome data structure that are permitted to be different from the baseline chromosome data structure in evaluating the one or more objective functions;

generate one or more chromosome data structures based at least in part on the range flag, wherein each of the one or more chromosome data structures comprise a first set of genes and a second set of genes, wherein each of the genes of the second set of genes corresponds to a respective gene of the first set of genes and indicates whether the corresponding gene of the first set of genes is permitted to be different from the baseline chromosome data structure in evaluating the one or more objective functions; and determine one or more objective values corresponding to the one or more chromosome data structures based at least in part on the baseline chromosome and the one or more objective functions.

12. The system of claim 11, wherein to receive the baseline chromosome data structure comprises at least one of: (i) receiving the baseline chromosome from user input; (ii) generating the baseline chromosome data structure.

13. The system of claim 11, wherein to identify the range flag comprises the at least one processor to execute the computer-executable instructions to receive the range flag from user input.

14. The system of claim 11, wherein the range flag further specifies a minimum number of genes of a chromosome data structure that are permitted to be different from the baseline chromosome data structure in evaluating the one or more objective functions.

15. The system of claim 11, wherein to generate the one or more chromosome data structures further comprises the at least one processor to execute the computer-executable instructions to generate a first set of one or more chromosomes by performing at least one of a: (i) a selection operation on at least one parent chromosome data structure; (ii) a crossover operation on at least one parent chromosome data structure; or (iii) a mutation operation on at least one parent chromosome data structure.

16. The system of claim 15, wherein to generate the one or more chromosome data structures further comprises the at least one processor to execute the computer-executable instructions to:

identify the chromosomes of the first set of one or more chromosomes that have a number of third set of genes set to 'ON' greater than the range flag; and modify the identified chromosomes of the first set of one or more chromosomes such that the number of third set of genes set to 'ON' for each of the identified chromosomes of the first set of chromosomes is no more than the range flag.

17. The system of claim 16, wherein to modify the identified chromosomes of the first set of one or more chromosomes comprises the at least one processor to execute the computer-executable instructions to:

select one of the first set of one or more chromosomes;

identify at least one of the genes of the third set of genes of the selected one of the first set of one or more chromosomes is to be flipped; and apply a second mutation operation to the identified at least one of the genes of the third set of genes.

18. The system of claim 11, wherein to determine one or more objective values comprises the at least one processor to execute the computer-executable instructions to:

select one of the one or more chromosome data structures;

identify each of the second set of genes of the selected one of the one or more chromosome data structures that are turned 'ON';

determine one or more differences between one or more genes of the first set of genes of the baseline chromosome data structure corresponding to the identified each of the second set of genes of the selected one of the one or more chromosome data structures that are turned 'ON' and one or more genes of the first set of genes of the selected one of the one or more chromosomes corresponding to the identified each of the second set of genes of the selected one of the one or more chromosome data structures that are turned 'ON'; and calculate, based at least in part on the one or more differences, at least one objective value corresponding to the selected one of the one or more chromosome data structures.

19. The system of claim 11, wherein the at least one processor further executes the computer-executable instructions to perform non-dominated sorting of the one or more chromosome data structures based at least in part on the one or more objective values.

20. The system of claim 19, wherein the at least one processor further executes the computer-executable instructions to identify an new baseline solution from the one or more chromosomes data structures based at least in part on the non-dominated sorting.

* * * * *